US009763050B2

(12) United States Patent
Belghoul et al.

(10) Patent No.: US 9,763,050 B2
(45) Date of Patent: *Sep. 12, 2017

(54) METHOD AND APPARATUS FOR LOCATION DETERMINATION WITH WLAN/WPAN/SENSOR SUPPORT

(71) Applicant: Apple Inc., Cupertino, CA (US)

(72) Inventors: Farouk Belghoul, Campbell, CA (US); Robert W. Mayor, Half Moon Bay, CA (US); Glenn D. MacGougan, San Jose, CA (US); Kumar Gaurav Chhokra, San Jose, CA (US); Syed A. Mujtaba, Santa Clara, CA (US); Dawei Zhang, Saratoga, CA (US); Tarik Tabet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,477

(22) Filed: Feb. 3, 2016

(65) Prior Publication Data

US 2016/0234644 A1 Aug. 11, 2016

Related U.S. Application Data

(60) Provisional application No. 62/113,294, filed on Feb. 6, 2015, provisional application No. 62/159,340, filed on (Continued)

(51) Int. Cl.
*H04W 4/02* (2009.01)
*G01C 5/06* (2006.01)
*H04W 4/22* (2009.01)

(52) U.S. Cl.
CPC ............. *H04W 4/025* (2013.01); *G01C 5/06* (2013.01); *H04W 4/22* (2013.01)

(58) Field of Classification Search
CPC ...... H04L 67/18; H04L 67/306; H04W 4/023; H04W 4/008; H04W 84/12; H04W 4/025;
(Continued)

(56) References Cited

U.S. PATENT DOCUMENTS

| 2005/0176441 A1* | 8/2005 | Jurecka | .................... G01S 19/09 455/456.1 |
| 2008/0228654 A1* | 9/2008 | Edge | ....................... G01S 19/48 705/71 |

(Continued)

OTHER PUBLICATIONS

Patent Application No. PCT/US2016/016410—International Search Report and Written Opinion mailed on May 25, 2016.

*Primary Examiner* — Anthony Addy
*Assistant Examiner* — Jing Gao
(74) *Attorney, Agent, or Firm* — Downey Brand LLP

(57) ABSTRACT

Apparatus and methods for estimating a location of a wireless device in communication with a wireless network, such as a UMTS network, based at least in part on WLAN/WPAN AP measurements and/or barometric measurements are disclosed. The wireless device responds to a location capability inquiry from the wireless network by providing a response that indicates the wireless device is configurable to estimate its location based on WLAN/WPAN AP and/or barometric measurements. The wireless network sends WLAN/WPAN AP and/or barometric reference information to the wireless device to assist in estimating its location. The wireless device measures one or more WLAN/WPAN APs, and the wireless device uses the WLAN/WPAN AP and/or barometric measurements to estimate its location. In some embodiments, GPS/GNSS information is used in conjunction with WLAN/WPAN AP and/or barometric measurements to estimate the location of the wireless device.

27 Claims, 17 Drawing Sheets

Related U.S. Application Data on May 10, 2015, provisional application No. 62/246,559, filed on Oct. 26, 2015, provisional application No. 62/159,341, filed on May 10, 2015, provisional application No. 62/246,558, filed on Oct. 26, 2015.

(58) Field of Classification Search
CPC ..... H04W 4/021; H04W 4/028; H04W 4/043; H04W 76/02; H04W 28/0215; H04W 28/08; H04W 36/0083; H04W 36/22; H04W 36/30

See application file for complete search history.

(56) References Cited

U.S. PATENT DOCUMENTS

| | | |
|---|---|---|
| 2010/0291947 A1 | 11/2010 | Annamalai |
| 2012/0013475 A1 | 1/2012 | Farley et al. |
| 2012/0258733 A1 | 10/2012 | Fischer et al. |
| 2014/0094178 A1 | 4/2014 | Eskicioglu et al. |
| 2014/0106789 A1 | 4/2014 | Moeglein et al. |
| 2015/0011236 A1* | 1/2015 | Kazmi ................ H04W 52/365 455/456.1 |
| 2015/0149133 A1* | 5/2015 | Do ....................... G01C 21/206 703/6 |
| 2016/0234645 A1 | 8/2016 | Belghoul et al. |

* cited by examiner

UE Capability Information Element Extension

| Information Element/ Group | Requirement | Type, Reference | Description |
|---|---|---|---|
| WLAN/WPAN Mode | MP | Enumerated ('Network based', 'UE based', 'Both', 'None') | Support for UE based and/or Network Based WLAN/WPAN Modes |
| Hybrid WLAN/WPAN Mode | MP | Enumerated ('Network based', 'UE based', 'Both', 'None') | Support for Hybrid WLAN/WPAN/ GPS/GNSS Modes |
| Barometric Mode | OP | Enumerated ('Network based', 'UE based', 'Both', 'None') | Support for Barometric Information Modes |

400

UE Positioning WLAN/WPAN/Barometric Assistance Data Information Element

| Information Element/ Group | Requirement | Type, Reference | Description |
|---|---|---|---|
| UE Positioning WLAN/ WPAN Assistance Data | OP | Sequence (SSID, HSSID, HeSSID, Frequency, Channel) | List of Preferred WLAN/WPAN Access Points for WLAN/WPAN and/or Hybrid Location Modes |
| Indoor Location Indication | MO | Boolean | Indicate When UE Enters or Exits Indoor Location |
| Barometric Reference Data | OP | Sequence(Barometric) | Barometric Reference Data |

System Information Block Message Extension

| Information Element/ Group | Requirement | Type, Reference | Description |
|---|---|---|---|
| WLAN/WPAN Identifiers | OP | Sequence (SSID, HSSID, HeSSID, Frequency, Channel, TX Power, Antenna Gain) | List of Preferred WLAN/WPAN Access Points for WLAN/WPAN and/or Hybrid Location Modes |
| Barometric Reference Data | OP | Sequence (Barometric Reference Data) | Barometric Reference Data (Atmospheric Pressure at Sea Level) |

430 →

Measurement Control Information Element Extension

| Information Element/ Group | Requirement | Type, Reference | Description |
|---|---|---|---|
| UE Positioning WLAN/ WPAN Assistance Data | OP | Sequence (SSID, HSSID, HeSSID, Frequency, Channel, TX Power, Antenna Gain) | List of Preferred WLAN/WPAN Access Points for WLAN/WPAN and/or Hybrid Location Modes |
| Indoor Location Indication | MO | Boolean | Indicate When UE Enters or Exits Indoor Location |
| Positioning Reporting Criteria | | | Criteria for Positioning Reporting to Network |
| UE Positioning Reporting Data | | WLAN/WPAN, Hybrid WLAN/WPAN, WLAN/ WPAN Measurements, Relative Time Stamp, WLAN/ WPAN Serving Flag | WLAN/WPAN Measurement Data Type to Provide to Network |
| Barometric Reference Data | OP | Sequence (Barometric Reference Data) | Barometric Reference Data (Atmospheric Pressure at Sea Level) |

*FIG. 4B*

Measurement Report Information Element Extension (UE-Based Results)

| Information Element/ Group | Requirement | Type, Reference | Description |
|---|---|---|---|
| UE Positioning WLAN/ WPAN/Barometric Sensor Measurements | OP | Longitude, Latitude, Altitude, Velocity | UE Positioning (UE Based WLAN/WPAN/ Barometric Sensor Measurements) |

440

Measurement Report Information Element Extension (UE-Assisted Results)

| Information Element/ Group | Requirement | Type, Reference | Description |
|---|---|---|---|
| UE Positioning WLAN/ WPAN/Barometric Sensor Assistance Data | OP | Sequence (MAC Address, SSID, HSSI, SNR, RSSI, REQ, RTT, AP Transmission Power, AP Antenna Gain, Barometric Pressure) | UE Assistance Data for NW Based UE Positioning (UE Assisted WLAN/WPAN/ Barometric Sensor Measurements) |

UE Positioning Capability Information Element Extension

| Information Element/ Group Name | Requirement | Type, Reference | Description |
|---|---|---|---|
| WLAN/WPAN Supported | MP | Enumerated ('Standalone', 'UE-assisted', 'Both', 'None') | Support for standalone UE-based and/or UE-assisted Network Based WLAN/WPAN Modes |
| WLAN/WPAN Measurements in UE-assisted Mode | MP | Bit String(8) ('RSSI', 'RTT', 'Both', 'None') | Support for Specific Measurements for WLAN/WPAN Modes. Respresented as a bit string with a "one" value indicated support and a "zero" value indicated no support for a particular measurement. |
| Sensors Supported | MP | Enumerated ('Standalone', 'UE-assisted', 'Both', 'None') | Support for standalone UE-based and/ or UE-assisted Network Based Barometric Pressure Sensor Modes |

UE Positioning WLAN/WPAN Measured Results
Information Element Extension

| Information Element/ Group Name | Requirement | Multi | Type, Reference | Description |
|---|---|---|---|---|
| WLAN Measured Result | MP | 1 to <maxWLAN> | | |
| WLAN AP BSSID | MP | | Octet string (6) | Basic Service Set Identifier (as defined in IEEE 802.11-2012) |
| WLAN AP SSID | OP | | Octet string (1..32) | Service Set Identifier (as defined in IEEE 802.11-2012) |
| WLAN RSSI | OP | | INTEGER(-127..128) | |
| WLAN RTT Value | OP | | INTEGER(0..16777215) | |
| WLAN RTT Units | OP | | ENUMERATED {microseconds, hundredsofnanoseconds, tensofnanoseconds, nanoseconds, tenthsofnanoseconds} | |
| WLAN RTT Accuracy | OP | | INTEGER(0..255) | |
| WPAN Measured Result | MP | 1 to <maxBT> | | |
| WPAN MAC Address | MP | | Octet string (6) | |
| WPAN RSSI | OP | | INTEGER(-127..128) | |
| WPAN RTT Value | OP | | INTEGER(0..16777215) | |
| WPAN RTT Units | OP | | ENUMERATED {microseconds, hundredsofnanoseconds, tensofnanoseconds, nanoseconds, tenthsofnanoseconds} | |
| WPAN RTT Accuracy | OP | | INTEGER(0..255) | |

*FIG. 4E*

UE Positioning Sensors Measured Results
Information Element Extension

| Information Element/ Group Name | Requirement | Multi | Type, Reference | Description |
|---|---|---|---|---|
| Uncompensated Barometric Pressure | MP | | INTEGER(30000..115000) | Measured Atmospheric Pressure in Units of Pa (corresponding to a numerical altitude resolution of 0.1m at sea level.) The measurement indicated in this IE can be obtained from measured atmospheric pressure output of one or more sensors of a UE prior to any adjustment made externally to the sensors. |

UE Positioning Reporting Quantity
Information Element Extension

| Information Element/ Group Name | Requirement | Type, Reference | Description |
|---|---|---|---|
| Indoor Method Type | MP | Enumerated ('UE-assisted', 'Standalone', 'UE-Assisted Preferred, Standalone Allowed', 'Standalone Preferred, UE-assisted Allowed') | Indoor Location (Positioning) Method Type Preference |
| Indoor Positioning Methods | MP | Enumerated ('WLAN/WPAN', 'Barometric Sensors') | Indoor Location (Positioning) Methods Supported |
| WLAN/WPAN Measurements Requested | OP | Bit String (8) | Bit 0 = RSSI  Bit 1 = RTT  Bits 2..7 = Reserved |

UE Capability Information Element Extension

| Information Element/ Group | Requirement | Type, Reference | Description |
|---|---|---|---|
| Indoor UE – Standalone Mode | MP | Boolean | Support for UE Standalone Modes for Indoor Location Positioning |

700

Measurement Report Extension (UE-Based Results)

| Information Element/ Group | Requirement | Type, Reference | Description |
|---|---|---|---|
| UE Positioning Indoor Standalone Measurements | OP | Longitude, Latitude, Altitude, Velocity | UE Positioning (UE Based Standalone Measurements) |

METHOD AND APPARATUS FOR LOCATION DETERMINATION WITH WLAN/WPAN/SENSOR SUPPORT

CROSS-REFERENCE TO RELATED APPLICATIONS

This Application claims the benefit of U.S. Provisional Application No. 62/113,294, entitled "METHOD AND APPARATUS FOR LOCATION DETERMINATION WITH WLAN SUPPORT", filed Feb. 6, 2015, U.S. Provisional Application No. 62/159,340, entitled "METHOD AND APPARATUS FOR LOCATION DETERMINATION WITH WLAN/WPAN/SENSOR SUPPORT", filed May 10, 2015, U.S. Provisional Application No. 62/246,559, entitled "METHOD AND APPARATUS FOR LOCATION DETERMINATION WITH WLAN/WPAN/SENSOR SUPPORT", filed Oct. 26, 2015, U.S. Provisional Application No. 62/159,341, entitled "METHOD AND APPARATUS FOR INDOOR LOCATION DETERMINATION WITH WLAN/WPAN/SENSOR SUPPORT", filed May 10, 2015, and U.S. Provisional Application No. 62/246,558, entitled "METHOD AND APPARATUS FOR INDOOR LOCATION DETERMINATION WITH WLAN/WPAN/SENSOR SUPPORT", filed Oct. 26, 2015, the contents of each of which are incorporated by reference herein in their entireties for all purposes.

This Application is related to U.S. patent application Ser. No. 15/014,487, entitled "METHOD AND APPARATUS FOR INDOOR LOCATION DETERMINATION WITH WLAN/WPAN/SENSOR SUPPORT", filed Feb. 3, 2016, the content of which is incorporated by reference herein in its entirety for all purposes.

FIELD

The described embodiments generally relate to wireless communications, including, to methods and apparatus for location determination of a wireless communication device with wireless local area network (WLAN), wireless personal area network (WPAN), and/or barometric sensor support.

BACKGROUND

Wireless communication devices, such as cellular telephones, cellular-enabled tablet computers, and other portable wireless devices with cellular communications capability can include wireless circuitry that can provide for communication in accordance with various wireless communication protocols. For example, cellular telephones, typically, include wireless personal area network (WPAN) radio frequency (RF) circuitry, such as Bluetooth® circuitry, and wireless local area network (WLAN) RF circuitry, such as Wi-Fi circuitry, to supplement cellular RF circuitry. Besides wireless communication capabilities, the WLAN RF circuitry and/or WPAN RF circuitry can provide, indirectly, a capability for a wireless communication device to estimate its location, e.g., a set of geospatial coordinates, using information based on RF signals received from one or more WLAN/WPAN access points (APs). (The use of the term "access point" or AP herein generally refers to a central wireless communication device that acts as a hub for a wireless network to interconnect multiple wireless communication devices. The AP can include a WLAN AP and/or a "master" WPAN device, which can be referred herein to informally as a WPAN AP.) The wireless communication device can be configured to use WLAN/WPAN AP information to supplement and/or to use in lieu of global positioning system (GPS) or global navigation satellite system (GNSS) information when estimating the location of the wireless communication device. When the wireless communication device operates indoors or in other locations in which GPS/GNSS signals can be attenuated or unavailable, the WLAN/WPAN AP information can be used to assist with estimating the location of the wireless communication device.

Multiple standards organizations define methods for location estimation, also referred to herein as positioning determination, for wireless communication devices, including the Third Generation Partnership Project (3GPP), which defines and publishes wireless communication protocols such as versions of Global System for Mobile Communications (GSM), Universal Mobile Telecommunications Services (UMTS), Long Term Evolution (LTE), and Long Term Evolution Advanced (LTE-A), the Open Mobile Alliance (OMA), which defines and publishes open standards for the mobile phone industry that apply across multiple cellular network technologies, and the Institute of Electrical and Electronics Engineers (IEEE), which standardizes wireless local area network (WLAN) communication protocols, such as the 802.11 family of standards. Each of the standards organizations can publish information about location/positioning aspects for wireless communication devices. Within 3GPP, standardized 3G wireless communication protocols, such as UMTS, include signaling layers, such as the radio resource control (RRC) layer at the control plane and the radio resources location services protocol (RRLP) at the user plane. The standardized 4G wireless communication protocols such as LTE/LTE-A include an LTE positioning protocol (LPP) at the control plane and the secure user plan location (SUPL) at the user plane. Furthermore, the OMA has defined LPP container extensions (LPPe) to support newer technologies, e.g., improved assisted GNSS (A-GNSS), observed time difference of arrival (OTDOA), and use of WLAN at the control plane, and SUPL3.0 at the user plane. Additionally, the IEEE committee generates an 802.11v wireless network management protocol and an 802.11mc communication protocol, which will be published forthwith as the 802.11-2015 wireless communication protocol.

Regulatory bodies, such as the Federal Communications Commission (FCC), may require that emergency services, such as "911", have access to the location of a wireless communication device, and, for "enhanced 911" (E911) services, require that the availability of location estimation of wireless communication devices extend to indoor locations (or other locations in which GPS/GNSS can be inaccurate or unavailable). The FCC may require that 67% of wireless communication device connections be locatable for E911 purposes within an accuracy of 50 meters and that 95% of such connections be locatable within an accuracy of 150 meters. For "next generation 911" (NG911) services, to be introduced within the next five years, the FCC may recommend that 80% of connected wireless communication device be locatable within an accuracy of 50 meters for a horizontal (latitude/longitude) direction and within an accuracy of 3 meters for a vertical (altitude) direction. Current wireless communication devices, using limited GPS/GNSS information, can achieve an accuracy of only approximately 250 to 500 meters today.

As such, there exists a need for solutions that provide methods and apparatuses for assisting location estimation by a wireless communication device using additional information, such as based on information about and/or measurements obtained from WLAN/WPAN APs and barometric sensors included in the wireless communication device. In this regard, it would be beneficial to provide for methods and apparatus that leverage WLAN/WPAN AP mappings and barometric sensor measurements to replace or supplement GPS/GNSS information used for estimating the location of a wireless communication device, particularly when connected to a wireless cellular network for emergency services access and when the wireless communication device operates at a location where GPS/GNSS information may be limited or unavailable.

SUMMARY

Apparatus and methods for estimating a location of a wireless communication device using a combination of GPS/GNSS signals (when available) and WLAN/WPAN information, such as WLAN/WPAN AP mapping and WLAN/WPAN AP measurements, alone or in combination with barometric sensor information, are described. Wireless communication devices can include a GPS/GNSS capability that uses GPS/GNSS signals to provide a location of the wireless communication device when such GPS/GNSS signals are available. Wireless communication devices can supplement the GPS/GNSS capability with a WLAN/WPAN access point (AP) location estimation capability, particularly for indoor location estimation when the GPS/GNSS signals can be attenuated or unavailable. Additionally, barometric sensor information can be used to estimate a vertical position (e.g., relative or absolute altitude) of the wireless communication device. The WLAN/WPAN AP and barometric sensor based location estimation capability can be used to improve the accuracy of location estimates for the wireless communication device, e.g., when the wireless communication device uses an emergency service (such as 911, E911, or NG911). In some embodiments, a WLAN/WPAN AP and barometric sensor based location estimate can be used in place of GPS/GNSS based estimates, e.g., when GPS/GNSS signals are not available. In some embodiments, the WLAN/WPAN AP and barometric sensor based location estimate can be used to supplement GPS/GNSS based estimates, e.g. when GPS/GNSS signals are attenuated. In some embodiments, the wireless communication device can estimate its location using WLAN/WPAN AP signals and WLAN/WPAN AP mapping information, e.g., available in one or more databases in, associated with, and/or reachable by the wireless communication device. In some embodiments, the wireless communication device can estimate its vertical position using barometric sensor information and barometric reference data, e.g., available in one or more databases in, associated with, and/or reachable by the wireless communication device. In some embodiments, the wireless communication device can estimate its location based on WLAN/WPAN AP signals and WLAN/WPAN AP mapping information, without requiring access to a cellular wireless network. In some embodiments, the wireless communication device can estimate its vertical location based on barometric sensor information and barometric reference data, without requiring access to a cellular wireless network. In some embodiments, the wireless communication device uses GPS/GNSS based estimates when operating in areas in which WLAN/WPAN access is limited or unavailable and WLAN/WPAN AP and barometric sensor based estimates (or a combination of GPS/GNSS and WLAN/WPAN AP and barometric sensor based estimates) when operating in areas in which WLAN/WPAN access exists with a high density of WLAN/WPAN APs. In some embodiments, WLAN/WPAN AP information can be used to determine a "horizontal" location of the wireless communication device and additional information derived from one or more sensors in and/or associated with the wireless communication device can be used to determine a "vertical" location of the wireless communication device. In some embodiments, a barometric sensor can be used to determine the "vertical" location of the wireless communication device. In some embodiments, the wireless communication device uses barometric sensor information in combination with reference barometric data maintained in the wireless communication device and/or obtained via a wireless network (e.g., a cellular wireless network, a WLAN, and/or a WPAN), such as reference barometric data that provides a barometric pressure value for a "sea level" or other "reference" vertical location/position value.

A wireless communication device can estimate its location using a combination of WLAN/WPAN AP measurements and WLAN/WPAN AP mapping information available in the wireless communication device, e.g., a locally stored and/or locally accessible WLAN/WPAN AP mapping. A wireless communication device can also estimate its location using WLAN/WPAN AP measurements and WLAN/WPAN AP mapping information supplemented by GPS/GNSS signals when available. In some embodiments, the wireless communication device uses barometric sensor data, alone or in combination with reference barometric data, to estimate a vertical location of the wireless communication device In some embodiments, the wireless communication device communicates with network elements of a cellular wireless network via a signaling connection e.g., a radio resource control (RRC) connection, to obtain and/or to provide location estimation information. In some embodiments, one or more RRC signaling messages can be used by the wireless communication device to communicate with one or more wireless access network elements, and/or via one or more wireless access network elements to other wireless network elements (e.g., within and/or associated with a core network), to receive and/or to provide location estimation information, e.g., using message exchanges as described herein. In some embodiments, the wireless communication device obtains WLAN/WPAN AP information and/or reference barometric data from a cellular wireless network, a non-cellular wireless network, and/or a server reachable via a wireless network (cellular or non-cellular). In some embodiments, a cellular wireless network provides a list of WLAN/WPAN APs to be used for location (positioning) estimation to the wireless communication device, e.g., based on cell identifier (ID) information, location area information, geo-fencing information, or other information that identifies an area/region in which the wireless communication device operates. The cellular wireless network can provide a list of WLAN/WPAN APs that are suitable for location estimation based on a particular cell or set of cells to which the wireless communication device is associated and/or connected. In some embodiments, the wireless communication device determines a set of WLAN/WPAN APs available for location estimation by scanning for and discovering available WLAN/WPAN APs without using (and/or supplementing) a list of WLAN/WPAN APs obtained from a wireless network (cellular and/or non-cellular). The wireless communication device can gather information, e.g., measurements and/or broadcast information, provided by the set of available WLAN/WPAN APs, and send this information to a cellular wireless access network element, e.g., a base station and/or radio network controller of a cellular wireless network, which can process the information and/or provide the information to one or more other network elements for processing. In some embodiments, the cellular wireless network operates in accordance with a Universal Mobile Telecommunications Service (UMTS) wireless communication protocol, and the cellular wireless access network element is a UMTS terrestrial radio access network (UTRAN) network element. The cellular wireless network can process the WLAN/WPAN AP information alone and/or using other mapping information to estimate a location (position) of the wireless communication device. In some embodiments, one or more servers and/or other processing and storage computing systems, can gather WLAN/WPAN AP information from multiple wireless communication devices and process the gathered WLAN/WPAN AP information to construct and/or update a map or database of WLAN/WPAN APs. In some embodiments, a cellular wireless network provides barometric reference data to be used for location (positioning) estimate, such as for "vertical" location estimation, by the wireless communication device. In some embodiments, the barometric reference data provides a reference "sea level" barometric value that can be applicable to a position of the wireless communication device (or within a particular radial distance of the wireless communication device). In some embodiments, the barometric reference data is provided and/or updated as the wireless communication device changes its "horizontal" location. In some embodiments, the wireless communication device maintains a database (or access a database) that associates barometric reference data with other location information, such as with a set of location coordinates.

In some embodiments, a cellular wireless network access network element, e.g., a serving radio network controller (SRNC) inquires of a wireless communication device, e.g., a user equipment (UE), of the UE's capabilities, e.g., when the UE associates with and/or connects with the cellular wireless network, and the UE provides information concerning its capabilities for location determination, e.g., GPS, GNSS, WLAN AP, WPAN AP, barometric sensor location estimation capabilities. In some embodiments, the UE indicates to the SRNC that the UE is capable of determining its location using a combination of GPS/GNSS information, WLAN/WPAN AP information, and/or barometric sensor information, e.g., WLAN/WPAN AP measurements, WLAN/WPAN AP mapping information, barometric sensor information, and/or barometric reference data, and the SNRC confirms with the UE its provided location estimation capabilities. In response to a location request from a core network element, the SRNC can provide one or more of: a set of measurements for the UE to perform and/or a set of location estimation assistance data (e.g., WLAN/WPAN AP mapping information and/or barometric reference data) for the UE to use. The SRNC can provide location assistance information to the UE as part of one or more signaling messages, e.g., via a radio resource control (RRC) connection and/or via broadcast system information block (SIB) messages. In some embodiments, the UE uses a combination of WLAN/WPAN AP measurements and WLAN/WPAN AP mapping information, alone or in combination with GPS/GNSS data, to determine a location estimate for the UE. In some embodiments, the UE uses barometric sensor information, alone or in combination with barometric reference data, to determine a "vertical" location estimate for the UE. The UE can provide an estimate of its location, e.g., "horizontal" and/or "vertical" location estimates, as determined by the UE, to the SRNC, e.g., as part of one or more measurement report signaling messages communicated via an RRC connection. The SRNC can reply to a location request from the core network with the UE location estimate provided by the UE. In some embodiments, the location request from the core network originates as part of an emergency services connection, which can be initiated by the user of the UE. In some embodiments, the UE provides measurements, e.g., GPS/GNSS data and/or WLAN/WPAN AP measurement data and/or WLAN/WPAN AP mapping information and/or barometric sensor information, to the SRNC, as part of a measurement report signaling message communicated via the RRC connection, and the SRNC in turn uses the provided measurements to estimate a location of the UE. In some embodiments, the SRNC communicates with a location server system, e.g., a stand-alone serving location mobile center (SAS) to estimate the location of the UE. In some embodiments, the SRNC communicates directly or indirectly with a server that maintains a WLAN/WPAN AP mapping to assist with estimating the location of the UE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIGS. 4A, 4B, 4C, 4D, 4E, 4F and 4G illustrate representative embodiments for extensions to information elements and/or system information block messages to accommodate communication of UE capabilities and/or location (positioning) information, in accordance with some embodiments.

FIG. 7 illustrates additional representative embodiments for extensions to information elements and/or system information block messages to accommodate communication of UE capabilities and/or location (positioning) information, in accordance with some embodiments.

DETAILED DESCRIPTION

Figure 1:
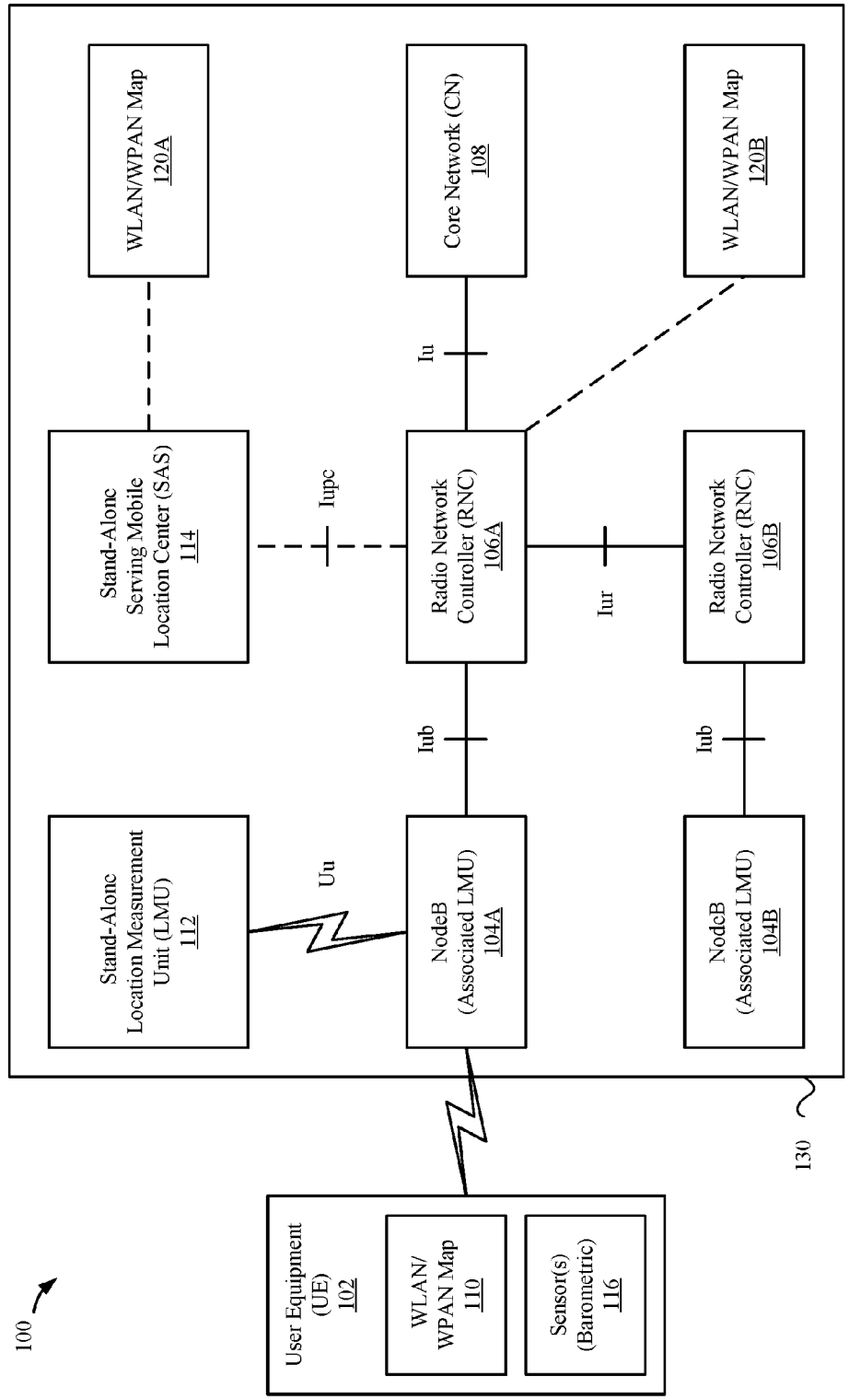
FIG. 1 depicts a wireless communication system including a wireless communication network and user equipment, each of which can comply with a 3GPP Universal Terrestrial Radio Access (UTRA) air interface wireless communication protocol, such as a UMTS wireless communication protocol, in accordance with some embodiments.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or as an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the wireless communication device can include a Bluetooth® (or more generically a WPAN) wireless communication subsystem or radio that can implement a Bluetooth wireless communication protocol, such as developed and published by the Bluetooth Special Interest Group (SIG).

Wireless communication networks that operate in accordance with UMTS wireless communication protocols can provide for location (positioning) determination (estimation) using a combination of signaling via a Radio Resource Control (RRC) connection at the control plane and communication via the Radio Resource Location Services Protocol (RRLP) at the user plane. A UMTS wireless communication network can use one or more of the following positioning methods: a cell identifier (ID) based method, an observed time difference of arrival (OTDOA) method, which can involve network-assisted configurable idle time periods, a network-assisted GPS/GNSS method, and an uplink time difference of arrival (U-TDOA) method. Current UMTS wireless communication networks do not provide support for location determination by a wireless communication device using WLAN/WPAN AP support, such as based on WLAN/WPAN AP measurements and/or WLAN/WPAN AP mapping information, while the wireless communication device operates within an indoor (or outdoor) location, nor do UMTS networks provide for a hybrid method that can use a combination of GPS/GNSS information and WLAN/WPAN AP measurements and mapping information for location determination. In addition, current UMTS location determination methods can be unable to satisfy new or future emergency services requirements, such as FCC mandated E911 and NG911 location capabilities. To satisfy E911 and NG911 location requirements for both UMTS and LTE/LTE-A wireless networks, both UMTS and LTE/LTE-A wireless communication protocols can be extended to support WLAN/WPAN information for WLAN/WPAN-based and/or hybrid WLAN/WPAN/A-GPS/GNSS-based location determination for wireless communication devices. As described further herein, UMTS wireless communication protocols that specify RRC connection signaling via the control plane can be extended to support location determination by wireless communication devices using WLAN/WPAN AP measurement and mapping information alone or in combination with GPS/GNSS information, e.g., both UE-based solutions, in which the UE provides a location estimate, and UE-assisted solutions, in which the UE provides additional information, such as WLAN/WPAN AP measurements, to network elements of a UMTS network to determine a location estimate. The solutions described herein can be used to extend location determination capabilities to wireless communication device operating in indoor locations while also increasing accuracy of location estimates provided by wireless communication devices and/or network elements, e.g., in response to location queries for emergency services.

In some embodiments, methods and apparatus to estimate a location (position) of a UE based on WLAN/WPAN information and/or GPS/GNSS supplemented with WLAN/WPAN information include the UE providing location determination (also referred to as positioning) capability to network elements of a wireless network, e.g., to one or more access network elements of a UMTS terrestrial radio access network (UTRAN), in response to an inquiry for UE capabilities. In some embodiments, the access network elements of the UTRAN can request whether the UE supports positioning capabilities, including, for example, specific types of location determination capabilities. In some embodiments, the access network elements of the UTRAN can request and/or provide location assistance data, e.g., a list of measurement information elements, a list of WLAN/WPAN access points, an indication of location of the UE (indoor, outdoor, entering indoor, exiting indoor, etc.). In some embodiments, the access network elements of the UTRAN can request location information from the UE through a set of RRC signaling messages, e.g., RRC measurement control messages, and the UE can respond with one or more of: location information, WLAN/WPAN measurements, GPS/GNSS information, one-time measurement reports, and periodic measurement reports. In some embodiments, e.g., UE-based solutions, the UE estimates its location (position) based on GPS/GNSS information and/or WLAN/WPAN measurements and/or based on sensor measurements, e.g., barometric sensors, and provides an estimate of the UE location to one or more access network elements of a cellular wireless network. In some embodiments, the UE logs location estimation during a measurement logging time interval and provides results as part of a logged measurement report send to access network elements, e.g., in one or more measurement reports. In some embodiments, e.g., UE-assisted solutions, the UE provides information to one or more access network elements of a cellular wireless network to assist the access network elements (and/or other network elements) of the cellular wireless network to estimate/determine a location of the UE, e.g., by use of measurement information, such as WLAN/WPAN AP measurements in addition to and/or in place of GPS/GNSS information, and network elements of the cellular wireless network use the information alone or in combination with additional information, such as WLAN/WPAN AP mapping information, to estimate/determine a location/position of the UE.

FIG. 1 depicts a wireless communication system 100, which can comply with a 3GPP Universal Terrestrial Radio Access (UTRA) air interface wireless communication protocol, e.g., a UMTS wireless communication protocol, and can include, but is not limited to including, a user equipment (UE) 102 in wireless communication with a UMTS wireless network 130 that includes a NodeB 104A (also referred to herein as a base station) connected to a radio network controller (RNC) 106A, the combination of which can be referred to as a UMTS Terrestrial Radio Access Network (UTRAN). Multiple NodeBs 104 can be connected to an RNC 106, and multiple RNCs 106, such as RNC 106A and 106B, can be interconnected, with each RNC 106A or 106B connected to one or more NodeBs 104, such as NodeB 104A and NodeB 104B. The UE 102 can connect with one or more NodeBs 104 to access services provided by and/or through a cellular wireless network. In some embodiments, the UE 102 can include (e.g., stored in local and/or associated storage units) WLAN/WPAN AP mapping information (e.g., a "WLAN/WPAN map") 110, which can include information for a set of WLAN/WPAN APs that can be used to assist with location determination/estimation by the UE 102. In some embodiments, the UE 102 can include one or more sensors 116, such as a barometric sensor, which can be used alone or in combination with barometric reference data to determine an absolute or relative vertical location, e.g., an altitude, of the UE 102. In some embodiments, the UE 102 can include barometric reference data accessible from local storage and/or remote storage, the barometric reference data providing information with which the UE 102 can "calibrate" barometric sensor information to determine/estimate a vertical location of the UE 102. In some embodiments, the barometric reference data includes atmospheric pressure data for sea level (or at another specified reference vertical position). In some embodiments, one or more network elements, e.g., a NodeB 104A and/or 104B, the LMU 112, the RNC 106A and/or 106B, and/or the SAS 114, can provide barometric reference data to assist the UE 102 when using locally measured barometric sensor information to determine a vertical location of the UE 102. In some embodiments, the barometric reference data can vary over time and can be periodically and/or on demand updated for the UE 102. In some embodiments, the barometric reference data is a mean sea level pressure (MSLP). In some embodiments, one or more NodeBs 104, such as NodeB 104A and/or NodeB 104B, can include an associated location management unit (LMU) with which to access location information and/or determine/estimate a location for one or more UEs 102. In some embodiments, a stand-alone LMU 112 can be interconnected with one or more NodeBs 104, e.g., NodeB 104A, by means of a wired and/or wireless connection. The stand-alone LMU 112 can provide additional access location information that can be used for determining/estimating a location/position for one or more UEs 102. The UMTS wireless network 130 can also include a stand-alone Serving Mobile Location Center (SMLC), also referred to as a stand-alone SMLC or SAS 112, which can estimate a location for one or more UEs 102 based on information provided by the RNC 106A, the NodeB 104A, the UE 102, and/or obtained from a database that contains WLAN/WPAN AP mapping information, such as WLAN/WPAN map 120A connected to the SAS 114 and/or a WLAN/WPAN map 120B connected to the RNC 106A. The SAS 114 can use any combination of methods for UE location estimation based on information obtained, such as using cell ID and/or time arrival information, supplemented by GPS/GNSS and/or WLAN/WPAN AP measurement information and/or barometric reference data in combination with barometric sensor information. The SAS 114 can obtain information for WLAN/WPAN AP mapping and coordinates that can be stored and/or be accessible via the WLAN/WPAN map 120A and/or the WLAN/WPAN map 120B. In some embodiments, the WLAN/WPAN maps 120A/B can include information for a set of WLAN/WPAN APs, such as medium access control (MAC) addresses, WLAN/WPAN AP names such as service set identifiers (SSIDs), basic service set identifiers (BSSIDs), and GPS/GNSS location information (or other geo-location coordinates) that can be used to assist in location estimation of one or more UEs 102 by network elements of the UMTS wireless network 130. The arrangement of network elements of the UMTS wireless network 130 can provide for both UE-based location estimation and UE-assisted location estimation based on WLAN/WPAN AP information (measurements and/or mapping data), supplemented in some embodiments with barometric sensor information and barometric reference data for vertical location (altitude) estimation, as well as hybrid methods that combine WLAN/WPAN AP information with GPS/GNSS (or assisted GPS/GNSS) information.

The UMTS wireless network 130 can determine capabilities of the UE 102 by requesting location (positioning) capabilities from the UE 102, e.g., as part of a UE capabilities inquiry via RRC signaling messaging. The UE 102 can respond with a list of location estimation capabilities of the UE, such as whether the UE supports UE-based location estimation, network-based location estimation, both UE-based and network-based location estimation, or no location estimation capabilities. In some embodiments, the UE location capabilities information provided by the UE 102 to the UMTS wireless network 130 can indicate location estimation capabilities of the UE 102 that are based on WLAN/WPAN AP information, and thus, the UE 102 can include other location estimation capabilities, such as GPS/GNSS location estimation capabilities, without necessarily supporting location estimation capabilities using and/or supplemented by WLAN/WPAN AP information. In some embodiments, the UMTS wireless network 130 can inquire whether the UE 102 includes one or more sensors to assist with location estimation, such as barometric sensor capabilities to assist with vertical location estimation. In some embodiments, the UE 102 can indicate support for UE-based, network-based, both UE-based and network-based, or no capability for barometric information modes, such as inclusion of a barometric sensor and/or vertical location estimation using barometric information (e.g., based on barometric sensor measurements with or without barometric reference data). In some embodiments, the UE 102 provides a location estimate to the UMTS wireless network 130 based at least in part on WLAN/WPAN AP information stored in, accessible to, and/or obtained by the UE 102, e.g., from within local and/or associated storage units, and/or obtained from associated servers via the UMTS wireless network 130. In some embodiments, the UE 102 provides location estimation information, such as WLAN/WPAN AP measurements, WLAN/WPAN AP mapping information, cell measurements, barometric sensor measurements, and can indicate whether the information provided are current (single shot) or historical (multiple shot). The UE 102 can provide the information on a one-time basis or periodically based on a configuration of the UE 102, in some embodiments. Network elements of the UMTS wireless network 130 can use the provided location information to assist with estimating a location of the UE 102.

Figure 2:
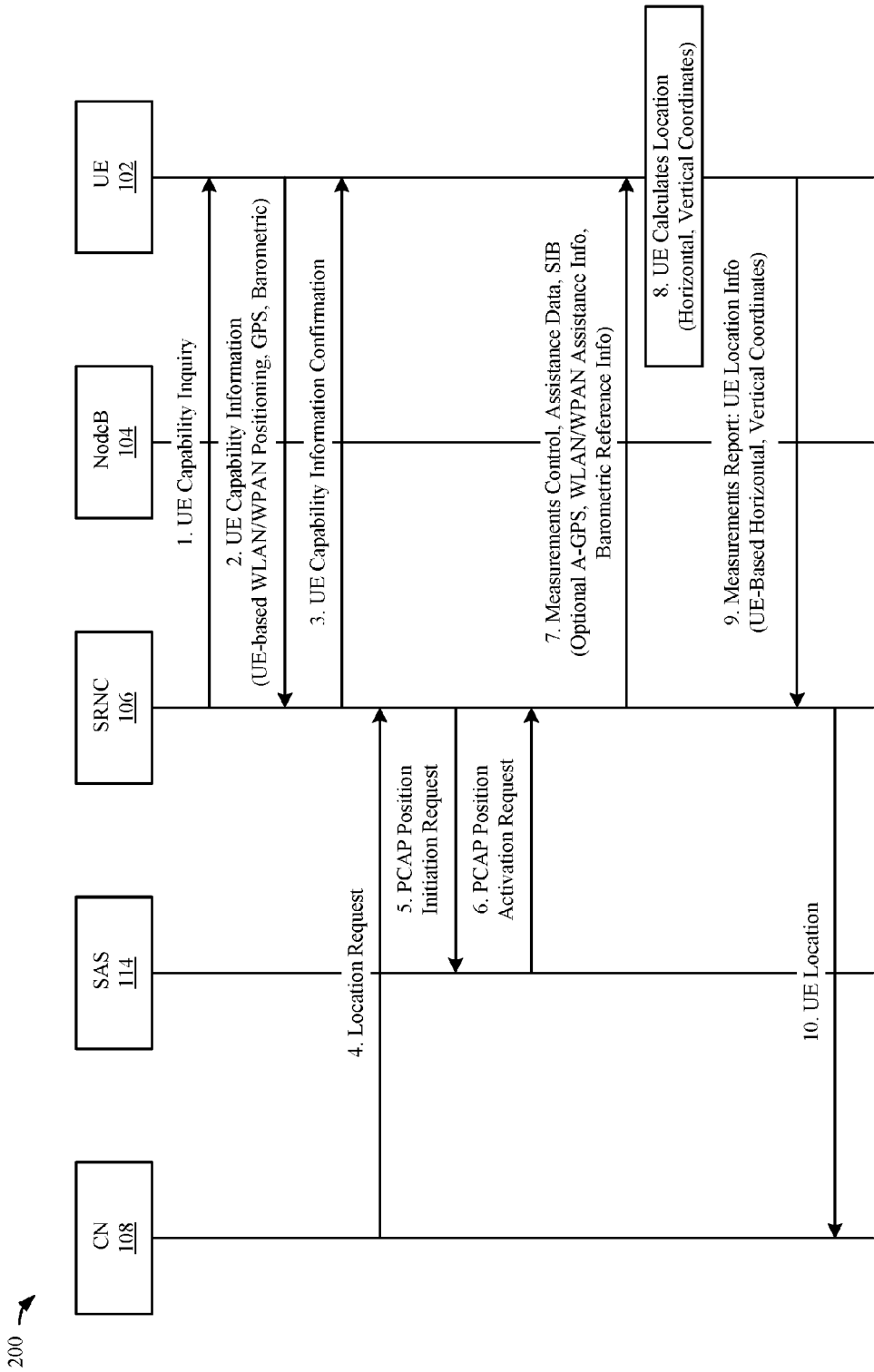
FIG. 2 illustrates a diagram of an exchange of messages between various network elements of a UMTS wireless network and user equipment (UE) as part of a UE-based location estimation procedure that can include the use of WLAN/WPAN information, barometric information, and assisted GPS/GNSS (A-GPS/A-GNSS) information, in accordance with some embodiments.

FIG. 2 illustrates a diagram 200 of an exchange of messages between various network elements of the UMTS wireless network 130 and the UE 102 as part of a UE-based location estimation procedure that can include the use of WLAN/WPAN information, barometric information, and assisted GPS/GNSS (A-GPS/A-GNSS) information. In a first step, a serving RNC (SRNC) 106 sends a message, via the NodeB 104 to the UE 102, inquiring about capabilities of the UE 102. The UE capability inquiry can be part of an RRC connection signaling message sent to the UE 102 by the SRNC 106 via the NodeB 104. The SRNC 106 in combination with one or more NodeBs 104 can be referred to as a UMTS terrestrial radio access network (UTRAN). The UE capability inquiry can include a request for general or specific UE capabilities, such as location estimation capabilities that the UE 102 can provide. In a second step, the UE 102 can respond to the UE capabilities inquiry from the SRNC 106 by providing UE capability information, e.g., as part of an RRC connection signaling message sent to the SRNC 106 via the NodeB 104. The UE capability information provided by the UE 102 to the SRNC 106 can include information about whether the UE 102 can perform location estimation, e.g., based on WLAN/WPAN information (such as WLAN/WPAN measurements and/or WLAN mapping data) obtained by the UE 102 (whether directly gathered by the UE 102 from one or more WLAN/WPAN APs and/or obtained by the UE 102 indirectly from a server or other network storage element), and/or whether the UE 102 can provide WLAN/WPAN AP information for location estimation, e.g., to assist one or more network elements to estimate a location of the UE 102. The UE capability information provided by the UE 102 to the SRNC 106 can also include information about whether the UE 102 includes one or more sensors, such as a barometric sensor, which can be used in combination with barometric reference data to estimate a vertical location (absolute or relative altitude) of the UE 102. In a third step, the SRNC 106 can provide confirmation of the UE provided UE capability information, e.g., via an RRC connection signaling message sent from the SRNC 106 to the UE 102 via the NodeB 104. In a fourth step, the core network 108 can send a location request to the SRNC 106 to which the UE 102 can be associated, e.g., as part of a location estimation procedure that can be initiated in conjunction with an emergency services connection, such as a "911" type of connection from the UE 102. In a fifth step, the SRNC 106 can inform the SAS 114 of a positioning capability application part (PCAP) initiation via a request message sent to the SAS 114. In a sixth step, the SAS 114, can respond to the PCAP position initiation request message received from the SRNC 106 with a PCAP position activation request message sent back to the SRNC 106. In a seventh step, the SRNC 106 can provide WLAN/WPAN assistance information, assisted GPS information, and/or barometric reference information to the UE 102, e.g., as part of one or more measurement control signaling messages, as part of a separate set of assistance data delivery, and/or as part of one or more broadcast system information block (SIB) messages. As described further herein, the UE 102 can receive WLAN/WPAN assistance information, assisted GPS information, and/or barometric reference information in one or more formatted information elements (IEs) as part of one or more SIB messages, measurement control messages, and/or "assistance data" delivery messages. In an eighth step, the UE 102 can estimate its location, e.g., based on WLAN/WPAN AP information obtained by the UE 102 directly or indirectly, based on barometric sensor and reference data (when available), and optionally based on additional GPS/GNSS (or A-GPS/A-GNSS) information. In a ninth step, the UE 102 can send information about its location to the SRNC 106 via the NodeB 104, e.g., as part of a measurement report message and/or another RRC connection signaling message sent to the SRNC 106 via the NodeB 104. The UE location information can include a set of UE-based location coordinates, which can include "horizontal" location information (e.g., surface coordinates) and/or "vertical" location information (e.g., altitude). In a tenth step, the SNRC 106 can provide a location for the UE 102 (e.g., as provided by the UE 102, or as modified by the SRNC 106 based on additional information available at the SRNC 106) to the core network 108, e.g., as part of a response to a location inquiry that can occur in conjunction with an emergency services connection. In some embodiments, the UE 102 estimates its location based on WLAN/WPAN AP information and/or based on barometric sensor information and provides the location estimate to the SRNC 106, which forwards the estimated location of the UE 102 to additional network elements within and/or associated with the core network 108.

Figure 3:
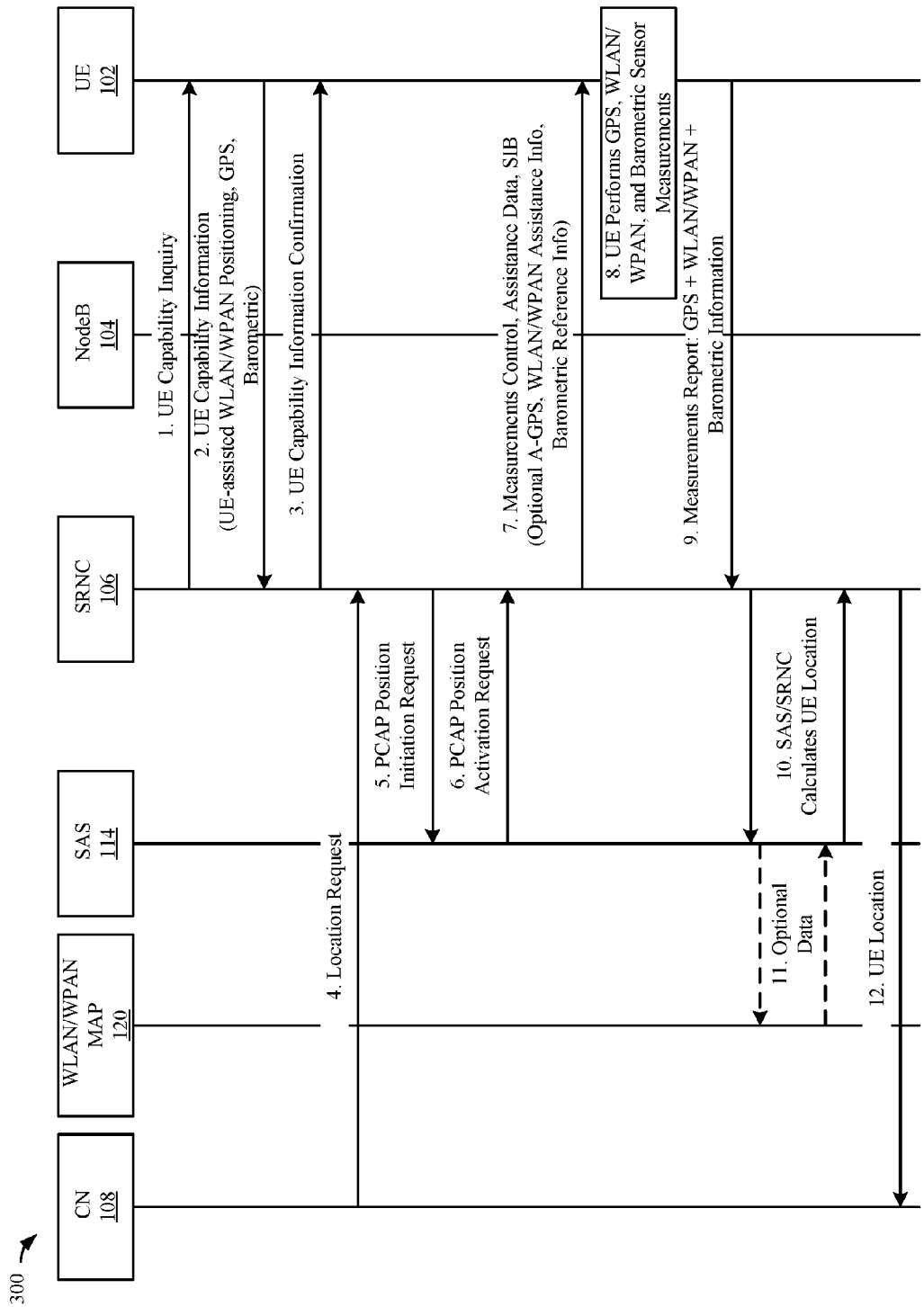
FIG. 3 illustrates a diagram of an exchange of messages between various network elements of a UMTS wireless network and a UE as part of a UE-assisted location estimation procedure that can include the use of WLAN/WPAN information, barometric information, and assisted GPS/GNSS (A-GPS/A-GNSS) information at the UE and at access network elements, in accordance with some embodiments.

FIG. 3 illustrates a diagram 300 of an exchange of messages between various network elements of the UMTS wireless network 130 and the UE 102 as part of a UE-assisted location estimation procedure that can include the use of WLAN/WPAN AP information and optionally including additional assisted GPS/GNSS (A-GPS/A-GNSS) information and/or barometric sensor information at the UE 102 and at the SRNC 106. In a first step, the SRNC 106 sends a message, via the NodeB 104 to the UE 102 inquiring about capabilities of the UE 102. The UE capability inquiry can be part of an RRC connection signaling message sent to the UE 102 by the SRNC 106 via the NodeB 104. The UE capability inquiry can include a request for general or specific UE capabilities, such as location estimation and/or location information capabilities that the UE 102 can provide. In some embodiments, the UE 102 can provide an estimate of its location determined by the UE 102. In some embodiments, the UE 102 can provide information so that one or more network elements can estimate a location of the UE 102 based at least in part on the provided information. In a second step, the UE 102 can respond to the UE capabilities inquiry from the SRNC 106 by providing UE capability information, e.g., as part of an RRC connection signaling message sent to the SRNC 106 via the NodeB 104. The UE capability information provided by the UE 102 to the SRNC 106 can include information about whether the UE 102 can perform location estimation, e.g., based on WLAN/WPAN AP information obtained by the UE 102 (whether directly gathered by the UE 102 from one or more WLAN APs and/or obtained by the UE 102 indirectly from a server or other network storage element), and/or whether the UE 102 can provide WLAN/WPAN AP information for location estimation, e.g., to assist one or more network elements to estimate a location of the UE 102. The UE capability information provided by the UE 102 to the SRNC 106 can also include information about whether the UE 102 includes one or more sensors, such as a barometric sensor, which can be used in combination with barometric reference data to estimate a vertical location (absolute or relative altitude) of the UE 102. In a third step, the SRNC 106 can provide confirmation of the UE provided UE capability information, e.g., via an RRC connection signaling message sent from the SRNC 106 to the UE 102 via the NodeB 104. In a fourth step, the core network 108 can send a location request to the SRNC 106 to which the UE 102 can be associated, e.g., as part of a location estimation procedure that can be initiated in conjunction with an emergency services connection, such as a "911" type of connection from the UE 102. In a fifth step, the SRNC 106 can inform the SAS 114 of a positioning capability application part (PCAP) initiation via a request message sent to the SAS 114. In a sixth step, the SAS 114, can respond to the PCAP position initiation request message received from the SRNC 106 with a PCAP position activation request message sent back to the SRNC 106. In a seventh step, the SRNC 106 can provide WLAN/WPAN assistance information, assisted GPS information, and/or barometric reference information to the UE 102, e.g., as part of one or more measurement control signaling messages, as part of a separate set of assistance data delivery, and/or as part of one or more broadcast system information block (SIB) messages. As described further herein, the UE 102 can receive WLAN/WPAN assistance information, assisted GPS information, and/or barometric reference information in one or more formatted information elements (IEs) as part of SIB messages, measurement control messages, and/or "assistance data" delivery messages. In an eighth step, the UE 102 perform a set of measurements that can be used to estimate its location, e.g., based on WLAN/WPAN information obtained by the UE 102 directly or indirectly, based on barometric sensor and reference data (when available), and optionally based on GPS/GNSS (or A-GPS/A-GNSS) information. In a ninth step, the UE 102 can send measurement information that can be used to estimate a location of the UE 102 to the SRNC 106, e.g., as part of a measurement report message and/or other RRC connection signaling message sent to the SRNC 106 via the NodeB 104. In a tenth step, the SNRC 106 can estimate a location of the UE 102, e.g., based at least in part on the information provided to the SRNC 106 by the UE 102. In some embodiments, the SRNC 106 communicates with the SAS 114 as part of a procedure to estimate the location of the UE 102. In some embodiments, in an eleventh step, the SAS 114 communicates with a server, such as a WLAN/WPAN map 120 database, to obtain and/or provide information for estimating the location of the UE 102, e.g., using WLAN/WPAN AP measurements in conjunction with other pre-stored WLAN/WPAN AP mapping information. In some embodiments, the SRNC 106 uses barometric sensor measurement information provided by the UE 102 alone or in combination with barometric reference data to determine/estimate a "vertical" location of the UE 102, which can be an absolute altitude, a relative altitude or the like. In a twelfth step, the SRNC 106 can provide the estimated location of the UE 102 to the core network 108, e.g., as part of a response to a location inquiry that can occur in conjunction with an emergency services connection.

For the message exchanges illustrated in FIGS. 2 and 3, various formatted messages can include information elements and/or fields as detailed herein and/or as listed in Appendix A.

Message Body Information Elements (IE) and/or System Information Block (SIB) Messages FIGS. 4A, 4B, 4C, 4D, 4E, 4F, and 4G illustrate representative embodiments for extensions to information elements and/or system information block messages to accommodate communication of UE capabilities and/or location (positioning) information in accordance with some embodiments. FIG. 4A illustrates a representative UE capability information element (IE) extension that the UE 102 can provide to a network element, e.g., the SRNC 106, in response to an inquiry about the UE's capabilities, e.g., a generic inquiry about UE capabilities or a specific inquiry about UE "positioning" (location) determination (estimation) capabilities received from the network element, e.g., the SRNC 106. The UE 102 can indication using a UE capability IE whether it supports a mode in which the UE 102 can use WLAN/WPAN AP information as part of a procedure for estimating the UE's location. As illustrated in Table 400 of FIG. 4A, a "WLAN/WPAN Mode" information element can include an indication that the UE 102 supports one of: a "network-based" estimation of the UE's location based at least in part on WLAN/WPAN AP information, a "UE-based" estimation of the UE's location based at least in part on WLAN/WPAN AP information, both a "network-based" estimation and a "UE-based" estimation of the UE's location based at least in part on WLAN/WPAN AP information, and no support for UE location estimation based on at least in part on WLAN/WPAN AP information. In some embodiments, one or more network elements, e.g., the SRNC 106, determine whether to perform location estimation of the UE 102 based on information provided by the UE 102 in a "WLAN/WPAN Mode" information element, e.g., communicated as part of a UE capabilities message, sent in response to a UE capabilities inquiry sent from the SRNC 106 to the UE 102. In some embodiments, one or more network elements, e.g., the SRNC 106, provide WLAN/WPAN AP information to the UE 102 conditionally based on whether the UE 102 supports a mode for UE location estimation using at least in part WLAN AP information.

As further illustrated in Table 400 of FIG. 4A, a "Hybrid WLAN/WPAN Mode" information element can include an indication that the UE 102 supports one of: a "network-based" estimation of the UE's location based at least in part on a combination of WLAN/WPAN AP information and GPS/GNSS information, a "UE-based" estimation of the UE's location based at least in part on a combination of WLAN/WPAN AP information and GPS/GNSS information, both a "network-based" estimation and a "UE-based" estimation of the UE's location based at least in part on a combination of WLAN/WPAN AP information and GPS/GNSS information, and no support for UE location estimation based on at least in part on a combination of WLAN/WPAN AP information and GPS/GNSS information. In some embodiments, one or more network elements, e.g., the SRNC 106, determine whether to perform location estimation of the UE 102 based on information provided by the UE 102 in a "Hybrid WLAN/WPAN Mode" information element, e.g., communicated as part of a UE capabilities message, sent in response to a UE capabilities inquiry sent from the SRNC 106 to the UE 102. In some embodiments, one or more network elements, e.g., the SRNC 106, provide WLAN/WPAN AP information to the UE 102 conditionally based at least in part on whether the UE 102 supports a mode for UE location estimation using at least in part WLAN/WPAN AP information. For example, the SRNC 106 can provide information to the UE 102 to assist in gathering and/or processing WLAN/WPAN AP information for estimation a location of the UE 102. In some embodiments, one or more of the information elements illustrated in Table 400 can be mandatory (indicated as "MP" in Table 400) or optional (indicated as "OP" in Table 400) in one or more versions of 3GPP UMTS wireless communication protocols.

As further illustrated in Table 400 of FIG. 4A, a "Barometric Mode" information element can include an indication that the UE 102 supports one of: a "network-based" estimation of the UE's location based at least in part on barometric information, a "UE-based" estimation of the UE's location based at least in part on barometric information, both a "network-based" estimation and a "UE-based" estimation of the UE's location based at least in part on barometric information, and no support for UE location estimation based on at least in part on barometric information. In some embodiments, the UE capability information indicated in the "barometric mode" IE can indicate the presence and/or functional status of one or more sensors that can be used to estimate and/or provide information for estimating a "vertical" location of the UE 102, such as from a barometric sensor. In some embodiments, one or more network elements, e.g., the SRNC 106, determine whether to perform "vertical" location estimation of the UE 102 based on information provided by the UE 102 in a "Barometric Mode" information element, e.g., communicated as part of a UE capabilities message, sent in response to a UE capabilities inquiry sent from the SRNC 106 to the UE 102. In some embodiments, one or more network elements, e.g., the SRNC 106, provide barometric reference data to the UE 102 conditionally based on whether the UE 102 supports a mode for UE location estimation using at least in part barometric information.

As illustrated in Table 410 of FIG. 4A, one or more network elements, e.g., the SRNC 106, can provide WLAN/WPAN assistance information to the UE 102 using one or more information elements, e.g., a "UE Positioning (Location) WLAN Assistance Data" information element. In addition, the one or more network elements can also provide barometric reference data, such as mean sea level pressure (MSLP) values for the UE 102 to use in conjunction with measured barometric sensor information to estimate a "vertical" location of the UE 102. The UE Positioning WLAN/WPAN/Barometric Assistance Data IE can include a list of preferred WLAN/WPAN access points for the UE 102 to use when operating in a WLAN/WPAN Mode, e.g., as described above for support of UE location estimation based at least in part on WLAN/WPAN AP information, or in a Hybrid WLAN/WPAN mode, e.g., as described above for support of UE location estimation based at least in part on a combination of WLAN/WPAN AP information and GPS/GNSS information. The SRNC 106 can provide information about each WLAN/WPAN AP in the list, including but not limited to one or more of: a service set identifier (SSID), a basic service set identifier (BSSID), an extended service set identifier (ESSIS), a homogeneous service set identifier (HSSID), a homogeneous extended service set identifier (HeSSID), one or more frequency bands, and one or more frequency channels (e.g., within a frequency band). In some embodiments, the UE Positioning WLAN/WPAN Assistance Data IE is optional (indicated as "OP" in Table 410) in one or more versions of 3GPP UMTS wireless communication protocols. In some embodiments, the UE 102 uses information provided in the UE Positioning WLAN Assistance Data IE to determine a set of WLAN APs to measure and report measurement data and/or location estimation back to the SRNC 106 based on the measurement results obtained.

As also illustrated in Table 410 of FIG. 4A, one or more network elements, e.g., the SRNC 106, can provide an "Indoor Location Indication" information element to the UE 102, which can include a Boolean operator that indicates whether the UE 102 should indicate when the UE 102 enters and indoor location or exits an indoor location. The UE 102 can perform a different location estimation procedure based at least in part on whether the UE 102 is located indoors or not located indoors. For example, the UE 102 can use a GPS/GNSS (non-assisted or assisted version) based location estimation procedure when located "not indoors" and with good access to satellite signals and can use a procedure based at least in part on WLAN AP information (possibly supplemented by GPS/GNSS information) when located "indoors". The use of the Indoor Location Indication IE by the SNRC 106 and/or the UE 102 can be mandatory or optional depending in various embodiments in accordance with one or more versions of 3GPP UMTS wireless communication protocols. In some embodiments, one or more network elements, e.g. the SRNC 106, send the UE positioning WLAN Assistance Data IE and/or the Indoor Location Indication IE using a measurements control signaling message, a system information block (SIB) message, an "Assistance Data Delivery" signaling message or another signaling message type.

As additionally illustrated in Table 410 of FIG. 4A, one or more network elements, e.g., the SRNC 106, can provide a "Barometric Reference Data" information element to the UE 102, which can include barometric reference data information that can be used by the UE 102 in conjunction with barometric sensor information to estimate a "vertical" location of the UE 102. In some embodiments, the Barometric Reference Data IE can be optional to provide to the UE 102. In some embodiments, the barometric reference data include one or more mean sea level pressure (MSLP) values that can provide a reference point by which barometric sensor information measured by a barometric sensor in the UE 102 can be used to estimate the "vertical" location of the UE 102. In some embodiments, the UE 102 uses information obtained from the Barometric Reference Data IE to calibrate location estimation in the UE 102 based on barometric sensor data measured by a barometric sensor in the UE 102. In some embodiments, an estimated "vertical" location of the UE can include an absolute estimate, e.g., in feet, meters, or another standard measurement unit above sea level. In some embodiments, the estimated "vertical" location of the UE can include a relative estimate, e.g., an indication of "ground" level or "first floor" or another recognizable relative indication of a "vertical" location of the UE 102.

FIG. 4B illustrates a table 420 summarizing a representative system information block (SIB) message extension that can be sent by one or more network elements, e.g., the SRNC 106 via the NodeB 104, to the UE 102, the SIB message extension including a set of WLAN/WPAN identifiers. In some embodiments, the SIB message extension includes a list of preferred WLAN/WPAN access points that can be used by the UE 102 when performing a location estimation based at least in part on WLAN/WPAN AP information (whether using WLAN/WPAN AP alone or in combination with GPS/GNSS information). In some embodiments, the SIB extension includes a sequence of information for each WLAN/WPAN AP in the list of preferred WLAN/WPAN APs, e.g., including one or more of: a service set identifier (SSID), a basic service set identifier (BSSID), an extended service set identifier (ESSIS), a homogeneous service set identifier (HSSID), a homogeneous extended service set identifier (HeSSID), one or more frequency bands, one or more frequency channels (e.g., within a frequency band), a reference transmit (TX) power level, and a reference antenna gain value. In some embodiments, the SIB message extension include an information element/group for barometric reference data that can be provided by one or more network elements, e.g., the SRNC 106 via the Node B 104, to the UE 102. In some embodiments, the SIB message extension illustrated in table 420 includes a sequence of one or more barometric reference data, such as mean sea level pressure values or other "fixed" altitude barometric values that can be used by the UE 102 to estimate/determine a "vertical" location of the UE 102. In some embodiments, the barometric reference data is provided to calibrate "vertical" location measurements of the UE 102, e.g., in conjunction with barometric sensor measurement data. In some embodiments, use of the SIB message extension for WLAN/WPAN AP information and/or the SIB message extension for barometric reference data by one or more network elements, e.g., the SRNC 106, can be optional in accordance with one or more UMTS wireless communication protocols.

FIG. 4B also illustrates a table 430 summarizing a representative measurement control information element extension that can be sent by one or more network elements, e.g., the SRNC 106 via the NodeB 104, to the UE 102, the measurement control IE extension including a set of WLAN/WPAN AP information as well as additional reporting information for which the UE 102 can respond to the one or more network elements accordingly. The measurement control information element extension also includes optional barometric reference data, which can include a set of barometric reference data, such as mean sea level pressure values for the UE 102 to use as part of a "vertical" location estimation/determination by the UE 102, such as in conjunction with measurement data from a barometric sensor in the UE 102. As indicated, the measurement control IE extension can include a set of UE positioning (location estimation) WLAN/WPAN AP assistance data, which can include a list of preferred WLAN/WPAN access points for which the UE 102 can measure and use data obtained therefrom for UE location estimation (or to provide to the one or more network elements to use for UE location estimation). The UE 102 can WLAN/WPAN APs indicated in the measurement control IE extension can be used by the UE 102 when performing location estimation based at least in part on WLAN/WPAN AP information (whether alone or in combination with GPS/GNSS information). In some embodiments, the SIB extension includes a sequence of information for each WLAN/WPAN AP in the list of preferred WLAN/WPAN APs, e.g., including one or more of: a service set identifier (SSID), a basic service set identifier (BSSID), an extended service set identifier (ESSIS), a homogeneous service set identifier (HSSID), a homogeneous extended service set identifier (HeSSID), one or more frequency bands, one or more frequency channels (e.g., within a frequency band), a reference transmit (TX) power level, and a reference antenna gain value. In some embodiments, the measurement control IE extension includes an "Indoor Location Indication" information element, which can include a Boolean operator that indicates whether the UE 102 should indicate when the UE 102 enters and indoor location or exits an indoor location. The UE 102 can perform a different location estimation procedure based at least in part on whether the UE 102 is located indoors or not located indoors. In some embodiments, the measurement control IE extension can also include a set of positioning reporting criteria, sent to the UE 102 by the one or more network elements, e.g., the SRNC 106 via the NodeB 104, to indicate under what conditions the UE 102 should report location (positioning) information, e.g., location estimates determined by the UE 102 and/or information by which the one or more network elements can estimate a location of the UE 102. In some embodiments, the measurement control IE extension can include a set of WLAN/WPAN measurement data types, e.g., a list of information and/or formatting for information, that the UE 102 can provide to the one or more network elements, e.g., to the SRNC 106 via the NodeB 104, to use as part of a location estimation procedure. In some embodiments, the measurement control IE extension specifies a set of mandatory or optional data elements to include in a measurement report provided by the UE 102 to the one or more network elements, e.g., to the SRNC 106 via the NodeB 104. As illustrated in Table 430 of FIG. 4B, the measurement control IE extension sent by the one or more network elements to the UE 102 can specify a list of measurement data to report including, but not limited to, one or more of: WLAN/WPAN type data (e.g., subsequent data is based on WLAN/WPAN AP measurements), Hybrid WLAN/WPAN type data (e.g., subsequent data is based on a combination of WLAN/WPAN AP measurements and GPS/GNSS information), a set of WLAN/WPAN AP measurements, a relative time stamp (e.g., when the last measurement was taken), a connection type flag for the WLAN/WPAN AP (e.g., whether the UE 102 is connected to and/or served by the WLAN/WPAN AP for which measurements are provided or just measured but not connected). In some embodiments, the UE 102 provides WLAN/WPAN AP measurement data in a list including information for a single measured WLAN/WPAN AP measured. In some embodiments, the UE 102 provides WLAN/WPAN AP measurement data in a list including information for multiple measured WLAN/WPAN APs.

FIG. 4C illustrates a set of measurement report information element extensions that the UE 102 can provide to one or more network elements, e.g., to the SRNC 106 via the NodeB 104, for location estimation based at least in part on WLAN/WPAN AP and/or barometric sensor measurements. Table 440 summarizes a Measurement Report IE extension for providing results from the UE 102 to the wireless network when the UE 102 performs the location estimation using WLAN/WPAN AP and/or barometric sensor measurements taken by the UE 102. The UE 102 can perform measurements of the WLAN/WPAN APs and use the measurements alone or in combination with GPS/GNSS information to estimate its location. In some embodiments, the UE 102 includes one or more sensors, such as a barometric sensor, that can be used to provide additional measurement information that can be used alone or in combination with barometric reference data to estimate a "vertical" location of the UE 102. The UE 102 can report the location estimation (positioning information) to one or more network elements, e.g., the SRNC 106 via the NodeB 104, on demand (e.g., in response to a query), based on a timer, based on a periodic schedule, based on a local trigger, and/or based on one or more reporting criteria provided by the one or more network elements. The UE 102 can report its location using a geo-location reference format, e.g., using a combination of one or more of: longitude, latitude, altitude, and velocity. In some embodiments, the use of the Measurement Report IE extension by the UE 102 can be optional (indicated as "OP" in Table 440) in accordance with one or more UMTS wireless communication protocols.

FIG. 4C also illustrates a Table 450 summarizing a Measurement Report IE extension for providing results from the UE 102 to the wireless network when the UE 102 measures one or more WLAN/WPAN APs (and optionally barometric sensor measurements) and one or more network elements of the wireless network, e.g., a combination of one or more of: the SRNC 106, the SAS 114, and the WLAN/WPAN MAP 120 illustrated in FIG. 3, estimate a location for the UE 102 using the provided measurements. In some embodiments, the measurements provided by the UE 102 to the wireless network include one or more of: WLAN/WPAN AP measurements, GPS/GNSS measurements, or barometric sensor measurements to assist in determining a location of the UE 102. The Measurement Report IE extension for "UE-Assisted Results" can include a sequence of formatted data including, but not limited to, one or more of: a medium access control (MAC) address, a service set identifier (SSID), a basic service set identifier (BSSID), an extended service set identifier (ESSIS), a homogeneous service set identifier (HSSID), a homogeneous extended service set identifier (HeSSID), a signal to noise ratio (SNR), a signal to interference plus noise ratio (SINR), a signal strength, a signal quality, a reference signal strength indicator (RSSI), a round-trip-time (RTT), a reference AP transmission power level, a reference AP antenna gain value, barometric pressure values. The one or more network elements, e.g., the SRNC 106 alone or in combination with the SAS 114 and the WLAN/WPAN MAP 120, can use the provided UE Assistance Data of WLAN/WPAN AP measurements (and optionally barometric pressure measurements) to estimate a location of the UE 102.

FIG. 4D illustrates a representative UE positioning capability information element (IE) extension that the UE 102 can provide to a network element, e.g., the SRNC 106, in response to an inquiry about the UE's capabilities, e.g., a generic inquiry about UE capabilities or a specific inquiry about UE "positioning" (location) determination (estimation) capabilities received from the network element, e.g., the SRNC 106. The UE 102 can indicate using a UE capability IE whether it supports one or more modes in which the UE 102 can use WLAN/WPAN/Sensor information as part of a procedure for estimating the UE's location. The UE Positioning Capability information element extension illustrated in Table 460 of FIG. 4D includes information elements that can be included to indicated UE Positioning capabilities, such as whether the UE 102 supports standalone and/or UE-assisted positioning for WLAN/WPAN and/or for barometric pressure sensors, as well as types of measurements that the UE 102 supports for WLAN/WPAN measurements in UE-assisted mode positioning.

As illustrated in Table 460 of FIG. 4D, a "WLAN/WPAN Supported" information element can include an indication that the UE 102 supports one of: a "Standalone" UE-based estimation of the UE's location based at least in part on WLAN/WPAN AP information, a "UE-assisted" Network-based estimation of the UE's location based at least in part on WLAN/WPAN AP information, both a "Standalone" estimation and a "UE-assisted" estimation of the UE's location based at least in part on WLAN/WPAN AP information, and no support for UE location estimation based on at least in part on WLAN/WPAN AP information. In some embodiments, one or more network elements, e.g., the SRNC 106, determine whether to perform location estimation of the UE 102 based on information provided by the UE 102 in a "WLAN/WPAN Supported" information element, e.g., communicated as part of a UE capabilities message, sent in response to a UE capabilities inquiry sent from the SRNC 106 to the UE 102. In some embodiments, one or more network elements, e.g., the SRNC 106, provide WLAN/WPAN AP information to the UE 102 conditionally based on whether the UE 102 supports a mode for UE location estimation using at least in part WLAN/WPAN AP information.

As further illustrated in Table 460 of FIG. 4D, a "WLAN/WPAN Measurements in UE-assisted Mode" information element can include an indication that the UE 102 supports one of the following in a UE-assisted mode: a "RSSI" (Received Signal Strength Indicator) WLAN/WPAN measurement, a "RTT" (Round Trip Time) measurement, both "RSSI" and "RTT" measurements, or neither "RSSI" nor "RTT" measurements to one or more network elements, e.g., to the SRNC 106, as measurement data to assist with UE location (position) determination by the one or network elements, as assisted by the UE 102. In some embodiments, the "WLAN/WPAN Measurements in UE-assisted Mode" information element, is formatted as a bit string, where a one-valued bit indicates support for a particular measurement type and a zero-valued bit indicates no support for a particular measurement type.

As further illustrated in Table 460 of FIG. 4D, a "Sensors Supported" information element can include an indication that the UE 102 supports one of: a "Standalone" UE-based estimation of the UE's location based at least in part on barometric pressure sensor information, a "UE-assisted" Network-based estimation of the UE's location based at least in part on barometric pressure sensor information, both a "Standalone" UE-based estimation and a "UE-assisted" Network-based estimation of the UE's location based at least in part on barometric pressure sensor information, and no support for UE location estimation based on at least in part on barometric pressure sensor information. In some embodiments, the UE capability information indicated in the "Sensors Supported" IE can indicate the presence and/or functional status of one or more sensors that can be used to estimate and/or provide information for estimating a "vertical" location of the UE 102, such as from a barometric pressure sensor. In some embodiments, one or more network elements, e.g., the SRNC 106, determine whether to perform "vertical" location estimation of the UE 102 based on information provided by the UE 102 in a "Sensors Supported" information element, e.g., communicated as part of a UE capabilities message, sent in response to a UE capabilities inquiry sent from the SRNC 106 to the UE 102. In some embodiments, one or more network elements, e.g., the SRNC 106, provide barometric pressure sensor reference data to the UE 102 conditionally based on whether the UE 102 supports a mode for UE location estimation using at least in part barometric pressure sensor information In some embodiments, one or more of the information elements illustrated in Table 460 can be mandatory (indicated as "MP") or optional (indicated as "OP") in one or more versions of 3GPP UMTS wireless communication protocols.

FIG. 4E illustrates a set of measurement report information element extensions that the UE 102 can provide to one or more network elements, e.g., to the SRNC 106 via the NodeB 104, for location estimation based at least in part on WLAN/WPAN AP measurements. Table 470 summarizes a UE Positioning WLAN/WPAN Measured Results IE extension for providing measurement results from the UE 102 to the wireless network when the UE 102 performs location estimation (at least in part) using WLAN/WPAN AP measurements taken by the UE 102. The UE 102 can perform measurements of the WLAN/WPAN APs and use the measurements alone or in combination with GPS/GNSS information to estimate its location. In some embodiments, the UE 102 provides the measurements to one or more network elements, e.g., for a UE-assisted Network-Based UE location (positioning) determination. In some embodiments, the number of WLAN measurement results provided is indicated by a value in a range from "one" to "maxWLAN". In some embodiments the WLAN measurement results are presented in a format as listed in Table 470 including a Basic Service Set Identifier (BSSID) for the WLAN represented as an octet string of six octets. In some embodiments, the WLAN service set identifier (SSID) is also provided as an octet string of one to 32 octets. The BSSID and SSID can be formatted as defined in IEEE 802.11-2012, which is incorporated by reference herein in its entirety for all purposes. In some embodiments, measurements of signal strength of the WLAN, e.g., a received signal strength indicator (RSSI) is provided as an integer value falling within a particular range of values, e.g., between −127 and 128. In some embodiments, measurements of a round trip time (RTT) of the WLAN are presented as an integer value fall within a particular range of values, e.g., between 0 and 16777215. In some embodiments, the WLAN RTT value is represented based on a set of WLAN RTT units that is explicitly indicated in the IE, e.g., as one or microseconds, hundreds of nanoseconds, tens of nanoseconds, nanoseconds, or tenths of nanoseconds. In some embodiments, an indication of accuracy is provided for the WLAN RTT as an integer value in a range of values, e.g., 0 to 255. In some embodiments, a WPAN (such as for Bluetooth) measured result is provided. In some embodiments the WPAN measurement results are presented in a format as listed in Table 470 including a Media Access Control (MAC) address represented as an octet string of six octets. In some embodiments, measurements of a signal strength of the WPAN, e.g., a received signal strength indicator (RSSI) is provided as an integer value falling within a particular range of values, e.g., between −127 and 128. In some embodiments, measurements of a round trip time (RTT) of the WPAN are presented as an integer value fall within a particular range of values, e.g., between 0 and 16777215. In some embodiments, the WPAN RTT value is represented based on a set of WPAN RTT units that is explicitly indicated in the IE, e.g., as one or microseconds, hundreds of nanoseconds, tens of nanoseconds, nanoseconds, or tenths of nanoseconds. In some embodiments, an indication of accuracy is provided for the WPAN RTT as an integer value in a range of values, e.g., 0 to 255. In some embodiments, providing particular measurement results for WLAN/WPAN measurements can be mandatory (indicated as "MP" in Table 470) or can be optional (indicated as "OP" in Table 470) in accordance with one or more UMTS wireless communication protocols.

FIG. 4F illustrates a Table 480 summarizing a Measurement Report IE extension for providing results from the UE 102 to the wireless network when the UE 102 measures atmospheric pressure using one or more sensors, e.g., using barometric pressure sensors. In some embodiments, one or more network elements of the wireless network, e.g., a combination of one or more of: the SRNC 106, the SAS 114, and the WLAN/WPAN MAP 120 illustrated in FIG. 3, estimate a vertical location for the UE 102 using the provided measurements. The UE Positioning Sensors Measured Results IE extension can include an uncompensated barometric pressure value, which can be represented as an integer in a range of values, e.g., from 30000 to 115000. The measured atmospheric pressure can be represented in units of Pa, which can correspond to a numerical altitude resolution of 0.1 m at sea level. The measurement value provided can be obtained by the UE 102 from one or more sensors of the UE 102 prior to any adjustment made externally to the sensors, in some embodiments. The uncompensated barometric pressure IE can be mandatory to be provided in some embodiments. In some embodiments, the UE Positioning WLAN/WPAN Measured Results IE Extension and/or the UE Positioning Sensors Measured Results IE Extension detailed in FIGS. 4E and 4F are included as part of a set of UE Positioning Measured Results or UE Positioning Measurement Event Results provided to one or more network elements.

In some embodiments, the UE 102 provides a stand-alone (UE-based) position estimate to one or more network elements using one or more information element extensions as detailed herein. In some embodiments, the UE 102 indicates what combination of location (positioning) mechanisms were used for the location estimate provided. For example, an information element included in a UE Positioning Position Estimate IE provided to one or more network elements can include a Position Data IE that is represented as a bit string an includes different bits to indicate a respective system capability used for the position estimate provided. In some embodiments, the Position Data IE includes an individual bit to indicate whether WLAN/WPAN measurement information was used for the location (position) estimate provided. In some embodiments, the Position Data IE includes an individual bit to indicate whether barometric pressure sensor measurement information was used for the location (position) estimate provided. In some embodiments, the Position Data IE includes additional bits for other position estimation capabilities, such as OTDOA, GPS, Galileo, GPS, GLONASS, etc. that are used alone or in combination with WLAN/WLAN and/or barometric pressure sensor measurement information for location estimates provided. In some embodiments, each bit in the bit string representation of the Position Data IE uses a "one" value to indicate that a respective system is used for location estimation (position calculation).

In some embodiments, one or more network elements can indicate to the UE 102 information about UE location (positioning) reporting, such as to express a set of required and/or allowed location methods to use. In some embodiments, one or more messages from one or more network elements can be sent to the UE 102 including a UE Positioning Quantity Information Element Extension as detailed in Table 490 of FIG. 4G. In some embodiments, an indoor positioning method type information element includes a preference by the one or more network elements that include this "Indoor Method Type" IE in the UE Positioning Quantity IE Extension. In some embodiments, the preference can be indicated as for a 'UE-Assisted' Network-based indoor positioning method to be used, a 'Standalone' UE-based indoor positioning method to be used, a 'UE-assisted' Network-based method to be preferred but a 'standalone' UE-based method to be allowed, or a 'standalone' UE-based method to be preferred but a 'UE-assisted' Network-based method to be allowed. In some embodiments, one of the four preferences listed can be included in the Indoor Method Type IE. In some embodiments, an indication of a set of one or more Indoor Positioning Methods supported by the one or more network elements can include an indication that WLAN/WPAN methods and/or Barometric Pressure Sensor methods are supported for indoor location (positioning) estimation. In some embodiments, a WLAN/WPAN Measurements Requested IE is included and is formatted as bit string to represent different measurements that are requested by the one or more network elements of the UE 102. In some embodiments, a bit is reserved for indicating that an RSSI value is requested and/or a bit is reserved for indicating that an RTT value is requested. In some embodiments, the UE 102 can respond with measurements as available and appropriately matched to the preferences indicated by the UE Positioning Reporting Quantity IE when providing measurement reports to the one or more network elements.

Figure 5:
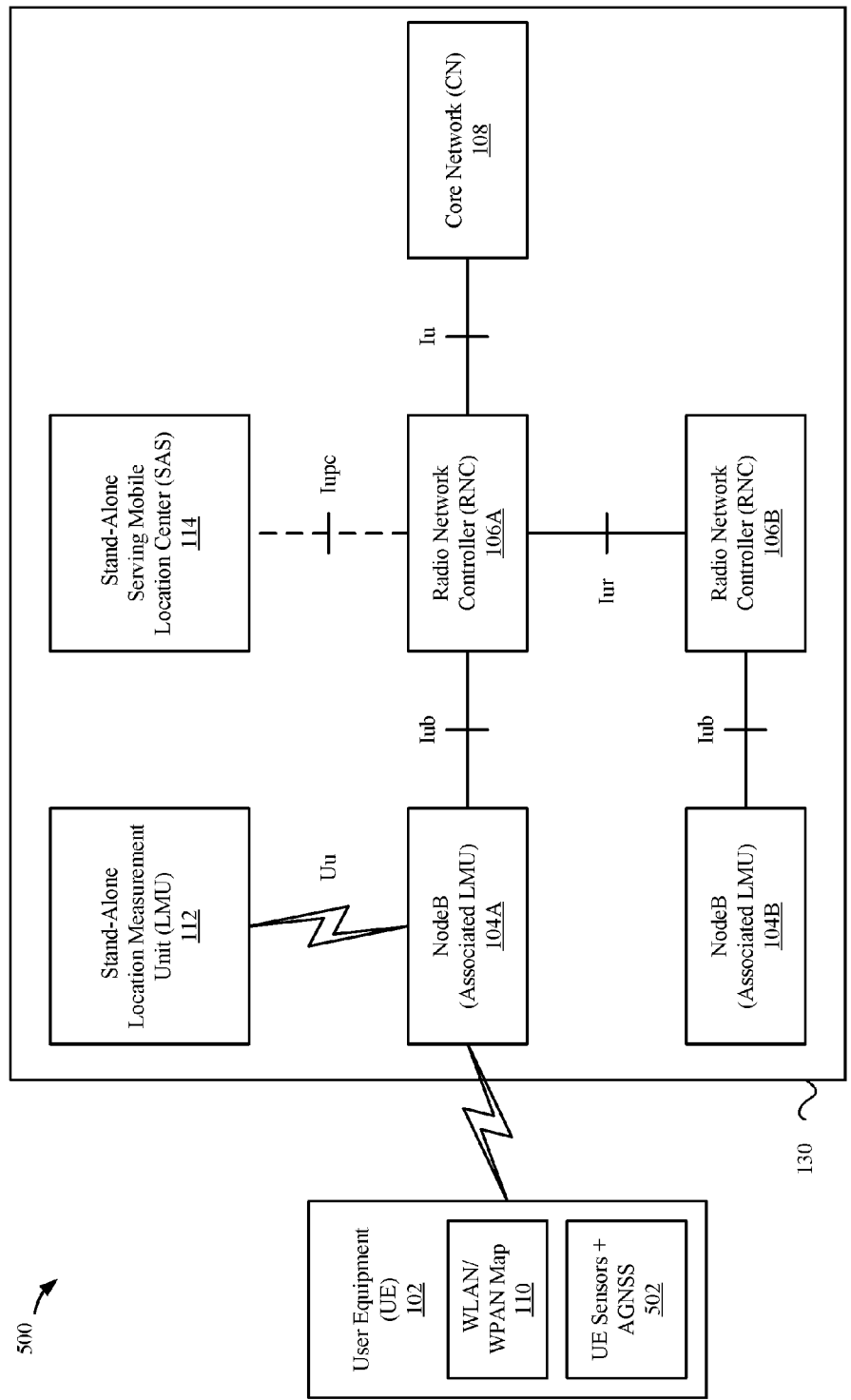
FIG. 5 depicts a wireless communication system for providing a "stand-alone" UE capability for determining/estimating a location (position) of a UE, in accordance with some embodiments.

FIG. 5 depicts a wireless communication system 500 for providing a "stand-alone" UE capability for determining/estimating a location (position) of a UE 102. The wireless communication system 500 resembles the wireless communication system 100 of FIG. 1, with the following changes: the optional WLAN/WPAN AP Map network elements 120A and 120B are not included in (or required by) the wireless communication system 500, and the UE 102 includes necessarily the WLAN AP Map 110. The UE 102 can use the WLAN/WPAN AP Map 110 in conjunction with a set of UE sensors and GPS/GNSS (or assisted GPS/GNSS) circuitry to determine a location of the UE 102. In some embodiments, the UE sensors included in the UE Sensors+AGNSS block 502 include a barometric sensor, which can be used to measure an atmospheric pressure level at the location of the UE 102. In some embodiments, the barometric sensor information can be used alone or in combination with barometric reference data to provide an absolute or relative vertical location of the UE 102. The UE 102 can estimate its location, including when located at an indoor location, and provide the location estimate to one or more network elements of the wireless network, e.g., to the RNC 106A via the NodeB 104A. In some embodiments, the RNC 106A inquires of the UE 102 about its capabilities, including whether the UE 102 can perform location estimation, such as by using a signaling message and/or an information element extension as described further herein. In some embodiments, the UE 102 provides information about its location estimation (positioning) capabilities to one or more network elements of the wireless network, e.g., to the RNC 106A via the NodeB 104A. When configured to perform location estimation, the UE 102 can provide location estimates periodically, on demand, one-time, or according to a particular schedule, to the one or more network elements, e.g., to the RNC 106A via the NodeB 104A.

Figure 6:
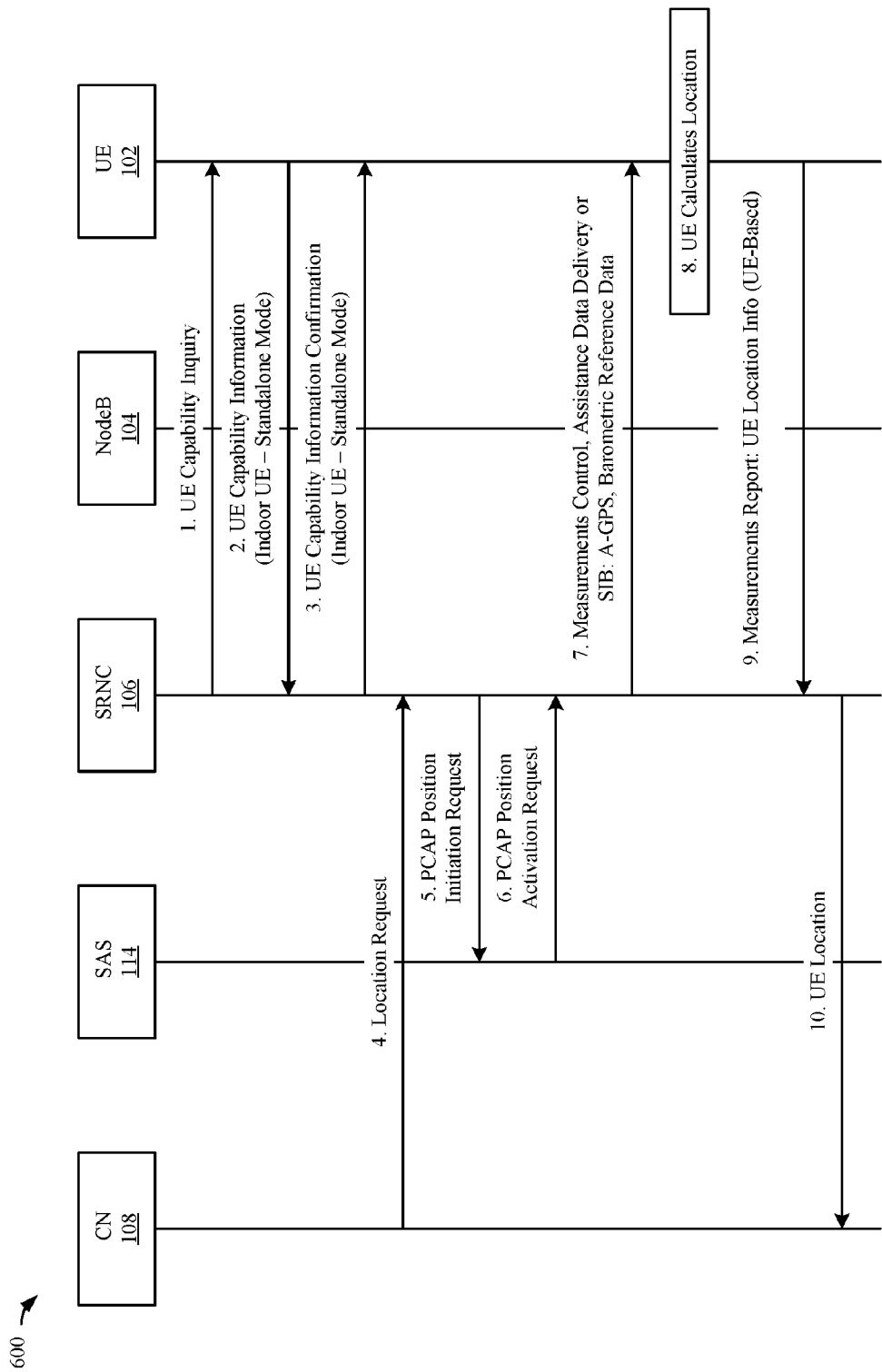
FIG. 6 illustrates a diagram of an exchange of messages between various network elements of a UMTS wireless network and a UE as part of a UE-based location estimation procedure that can include the use of WLAN/WPAN information, assisted GPS/GNSS (A-GPS/A-GNSS) information, and barometric information in accordance with some embodiments.

FIG. 6 illustrates a diagram 600 of an exchange of messages between various network elements of the UMTS wireless network 130 and the UE 102 as part of a UE-based location estimation procedure that can include the use of WLAN/WPAN information, barometric sensor information, and/or assisted GPS/GNSS (A-GPS/A-GNSS) information. In a first step, a serving RNC (SRNC) 106 sends a message, via the NodeB 104 to the UE 102 inquiring about capabilities of the UE 102. The UE capability inquiry can be part of an RRC connection signaling message sent to the UE 102 by the SRNC 106 via the NodeB 104. The UE capability inquiry can include a request for general or specific UE capabilities, such as location estimation and/or location information capabilities that the UE 102 can provide. In a second step, the UE 102 can respond to the UE capabilities inquiry from the SRNC 106 by providing UE capability information, e.g., as part of an RRC connection signaling message sent to the SRNC 106 via the NodeB 104. The UE capability information provided by the UE 102 to the SRNC 106 can include information about whether the UE 102 can perform location estimation while at an indoor location in a "stand-alone" mode, e.g., based on WLAN/WPAN information obtained by the UE 102 and/or based on barometric sensor information measured by the UE 102. In a third step, the SRNC 106 can provide confirmation of the UE provided UE capability information, e.g., via an RRC connection signaling message sent from the SRNC 106 to the UE 102 via the NodeB 104. In a fourth step, the core network 108 can send a location request to the SRNC 106 to which the UE 102 can be associated, e.g., as part of a location estimation procedure that can be initiated in conjunction with an emergency services connection, such as a "911" type of connection from the UE 102. In a fifth step, the SRNC 106 can inform the SAS 114 of a positioning capability application part (PCAP) initiation via a request message sent to the SAS 114. In a sixth step, the SAS 114, can respond to the PCAP position initiation request message received from the SRNC 106 with a PCAP position activation request message sent back to the SRNC 106. In a seventh step, the SRNC 106 can provide WLAN/WPAN/Barometric assistance information to the UE 102, e.g., as part of one or more measurement control signaling messages, as part of a separate set of assistance data delivery, and/or as part of one or more broadcast system information block (SIB) messages. As described previously herein, the UE 102 can receive WLAN/WPAN/Barometric assistance information in one or more formatted information elements (IEs) as part of SIB messages, measurement control messages, and/or "assistance data" delivery messages. In an eighth step, the UE 102 can estimate its location, e.g., based on WLAN/WPAN information obtained by the UE 102 directly or indirectly, based on barometric sensor information, and/or based on GPS/GNSS (or A-GPS/A-GNSS) information. In a ninth step, the UE 102 can send information about its location to the SRNC 106, e.g., as part of a measurement report message and/or other RRC connection signaling message sent to the SRNC 106 via the NodeB 104. The UE location information provided can include a "horizontal" surface location estimate and/or a "vertical" location estimate. The UE location information provided can be based on absolute measurement values and/or based on relative measurement values. In some embodiments, the UE 102 can provide an absolute location estimate (e.g., a set of location coordinates in recognizable units) and/or a relative location estimate (e.g., an address, a building name, a floor, a landmark name, etc.) In a tenth step, the SNRC 106 can provide a location for the UE 102 (e.g., as provided by the UE 102, or as modified by the SRNC 106 based on additional information available at the SRNC 106) to the core network 108, e.g., as part of a response to a location inquiry that can occur in conjunction with an emergency services connection. In some embodiments, the UE 102 estimates its location based on WLAN/WPAN AP information and/or using barometric sensor information and provides the location estimate to the SRNC 106, which forwards the estimated location of the UE 102 to additional network elements within and/or associated with the core network 108.

FIG. 7 illustrates a table 700 summarizing a UE Capability IE extension that can be used by the UE 102 to indicate whether the UE 102 supports a capability to determine its own location while operating at an indoor location and in a "stand-alone" mode, e.g., without requiring assistance from the wireless network to determine its location. The "Indoor UE-Standalone Mode" IE extension can be a required (mandatory) IE or an optional IE in accordance with one or more UMTS wireless communication protocols, in some embodiments. The "Indoor UE-Standalone Mode" IE extension can include a Boolean value that indicates whether the UE 102 supports or does not support the mode of operation for location estimation. FIG. 7 also illustrates a table 710 summarizing a Measurement Report extension to provide UE-based results for reporting a location estimate of the UE 102 determined while operating in an indoor location while in a "stand-alone" mode. The "UE Positioning Indoor Standalone Measurements" IE extension illustrated in Table 710 can be optional in accordance with one or more UMTS wireless communication protocols. The Measurement Report Extension illustrated in Table 710 can include a set of formatted data by which the UE 102 can indicate its estimated location to one or more network elements, e.g., to the SRNC 106 via the NodeB 104. The UE 102 can perform the measurements of the WLAN/WPAN APs and use the measurements alone or in combination with GPS/GNSS information to estimate its location. In some embodiments, the UE 102 can include one or more sensors, such as a barometric sensor, by which barometric information can be measured and compared with barometric reference data to provide a "vertical" location estimate of the UE 102. The UE 102 can report the location estimation (positioning information) to one or more network elements, e.g., the SRNC 106 via the NodeB 104, on demand (e.g., in response to a query), based on a timer, based on a periodic schedule, based on a local trigger, and/or based on one or more reporting criteria provided by the one or more network elements. The UE 102 can report its location using a geo-location reference format, e.g., using a combination of one or more of: longitude, latitude, altitude, and velocity.

Figure 8:
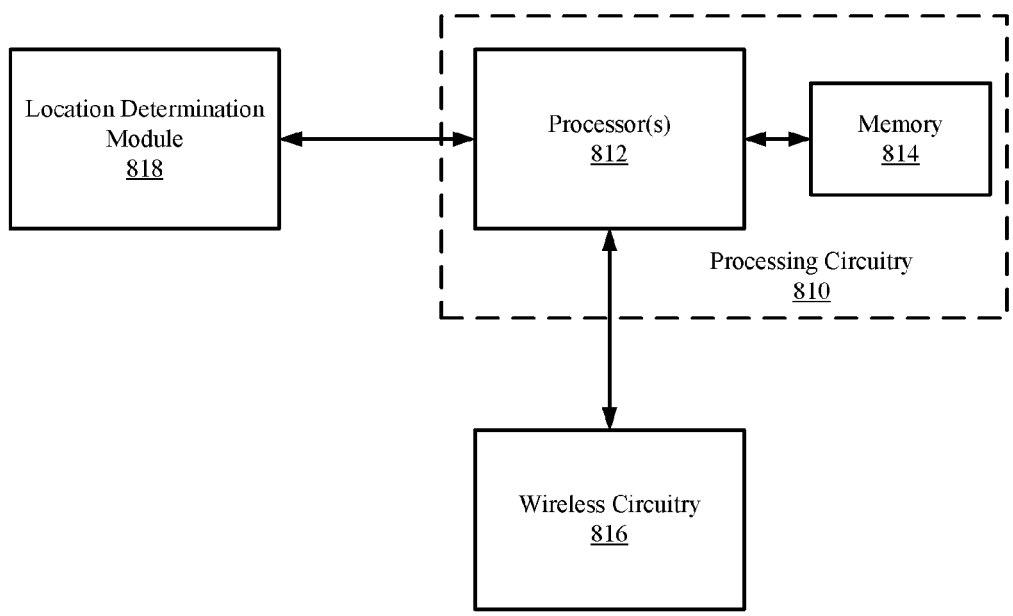
FIG. 8 illustrates a block diagram of components of a wireless communication device, such as a UE, in accordance with some embodiments.

FIG. 8 illustrates a diagram 800 of components of a wireless communication device, such as UE 102, including one or more processor(s) 812 coupled to memory 814, which together can be referred to as processing circuitry 810, wireless circuitry 816 that provides for wireless radio frequency (RF) connections between the UE 102 and various wireless networks, e.g., the wireless networks included in the wireless communication system 100 of FIG. 1 and/or the wireless communication system 500 of FIG. 5. The UE 102 can also include a location determination module 818 configurable to operate together with the processing circuitry 810 and the wireless circuitry 816 to perform one or more operations for the UE 102 as described herein to realize location estimation (positioning determination) of the UE 102. In some embodiments, the location determination module 818 estimates a location of the UE 102 based at least in part on WLAN/WPAN AP information obtained by the UE 102, e.g., via measurements and/or based on information provided by network elements of a wireless network. In some embodiments, the UE 102 includes a barometric sensor and can measure barometric information for the location of the UE 102 and use the barometric measurements alone or in combination with barometric reference data to estimate a vertical location of the UE 102. In some embodiments, the wireless circuitry 816 includes one or more baseband processor(s), and a set of RF analog front-end circuitry. In some embodiments, the wireless circuitry 816 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 816 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more wireless networks.

The processor(s) 812 and the wireless circuitry 816 can be configured to perform and/or control performance of one or more functionalities of the UE 102, in accordance with various implementations. The processor(s) 812 and the wireless circuitry 816 can provide functionality for controlling communication and/or location determination for the UE 102. The processor(s) 812 may include multiple processors of different types that can provide for both wireless communication management and/or higher layer functions, e.g., one or more of the processor(s) 812 may be configured to perform data processing, application execution, and/or other device functions according to one or more embodiments of the disclosure. The UE 102, or portions or components thereof, such as processor(s) 812, can include one or more chipsets, which can respectively include any number of coupled microchips thereon.

In some embodiments, the processor(s) 812 may be configured in a variety of different forms. For example, the processor(s) 812 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 812 of the UE 102 can be coupled to and/or configured in operative communication with each other, and these components may be collectively configured to perform location determination of the UE 102 based at least in part on WLAN/WPAN AP information and/or barometric information, e.g. in conjunction with the location determination module 818. In some implementations, the processor(s) 812 can be configured to execute instructions that may be stored in memory 814, or that can otherwise be accessible to the processor(s) 812 in some other device memory. As such, whether configured as, or in conjunction with, hardware or a combination of hardware and software, the processor(s) 812 may be capable of performing operations according to various implementations described herein, when configured accordingly. In various embodiments, memory 814 in the UE 102 may include multiple memory devices that can be associated with any common volatile or non-volatile memory type. In some scenarios, the memory 814 may be associated with a non-transitory computer-readable storage medium that can store various computer program instructions, which may be executed by the processor(s) 812 during normal program executions. In this regard, the memory 814 can be configured to store information, data, applications, instructions, or the like, for enabling the UE 102 to carry out various functions in accordance with one or more embodiments of the disclosure. In some implementations, the memory 814 may be in communication with, and/or otherwise coupled to, the processor(s) 812, as well as one or more system buses for passing information between and amongst the different device components of the UE 102.

It should be appreciated that not all of the components, device elements, and hardware illustrated in and described with respect to the UE 102 shown in FIG. 8 may be essential to this disclosure, and thus, some of these items may be omitted, consolidated, or otherwise modified within reason. Additionally, in some implementations, the subject matter associated with the UE 102 can be configured to include additional or substitute components, device elements, or hardware, beyond those depicted within the illustration of FIG. 8.

Figure 9:
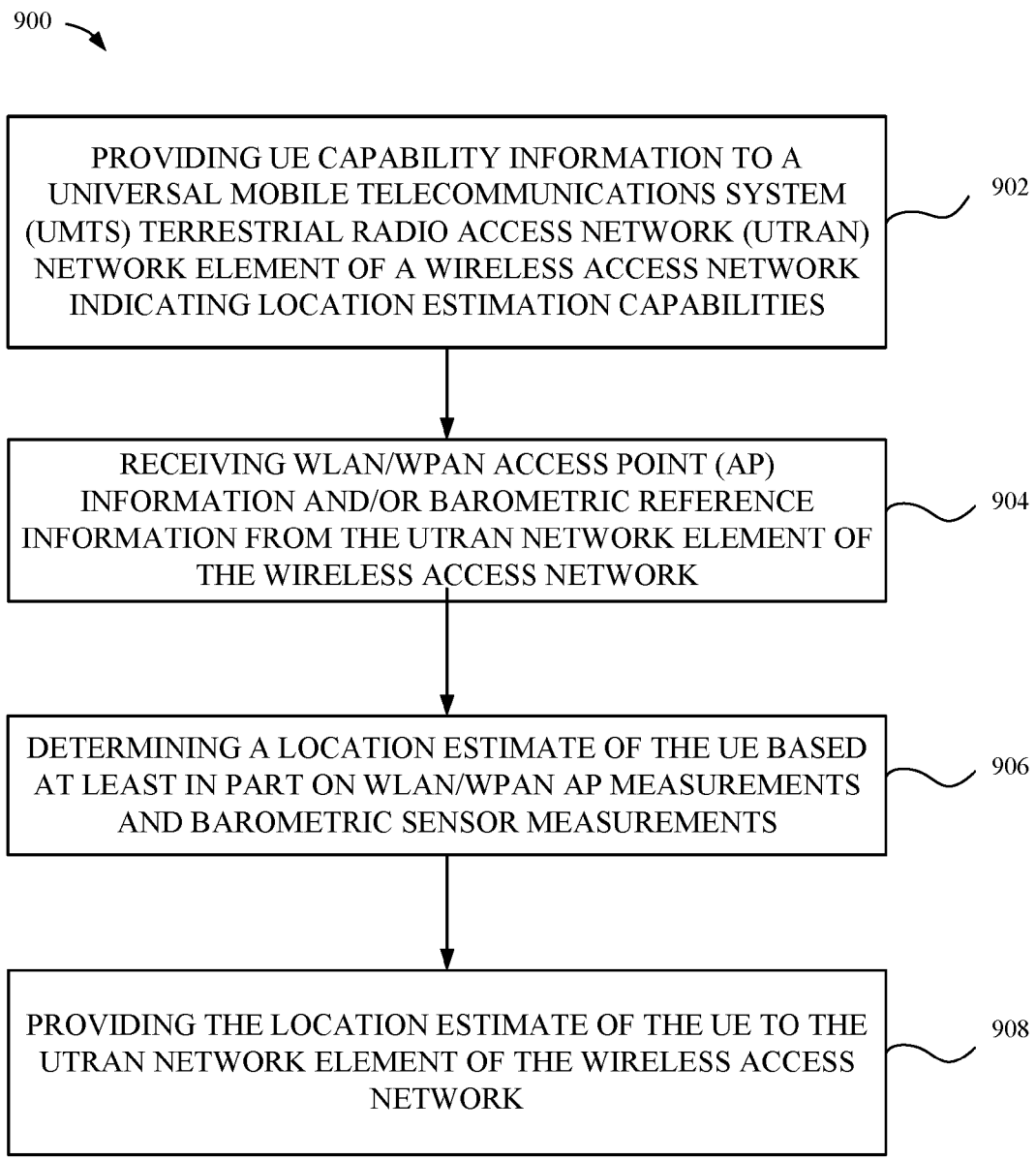
FIG. 9 illustrates a flowchart depicting an example method by a wireless communication device for estimating a location of the wireless communication device based at least in part on a combination of one or more of: wireless local area network (WLAN) access point (AP) measurements, wireless personal area network (WPAN) measurements, or barometric sensor measurements, in accordance with some embodiments.

FIG. 9 illustrates a flowchart 900 of a representative method by a wireless communication device, e.g., UE 102, to estimate a location of the UE 102 based at least in part on WLAN/WPAN AP measurements and/or barometric sensor measurements. In step 902, the UE 102 provides UE capability information for the UE 102 to a network element of a wireless access network, e.g., the SRNC 106 via NodeB 104. In some embodiments, the network element is a UTRAN of a cellular wireless network operating in accordance with a UMTS wireless communications protocol. In some embodiments, the UE 102 provides the UE capability information to the network element of the wireless access network in response to receipt of a capabilities inquiry message from the network element of the wireless access network. In some embodiments, the capabilities information provided to the network element of the wireless access network includes an indication of location estimation capabilities of the UE 102, e.g., whether the UE 102 can estimate its location based at least in part on WLAN/WPAN AP information (and optionally additionally based on barometric sensor measurements) and/or can provide a location estimate, WLAN/WPAN AP measurements, and/or barometric sensor measurements to the network element of the wireless access network. In some embodiments, the capabilities inquiry received from the network element of the wireless access network includes a "general" inquiry about location estimation capabilities of the UE 102, while in some embodiments, the capabilities inquiry includes a "specific" inquiry about location estimation capabilities regarding the use of WLAN/WPAN AP information, the use of barometric information, and/or the use of (assisted or non-assisted) GPS/GNSS information by the UE 102 to estimate its location. In step 904, the UE 102 receives from the network element of the wireless access network, e.g., from the SRNC 106 via NodeB 104, WLAN/WPAN AP information. In some embodiments, barometric reference information is provided by to the UE 102 by one or more network elements of the wireless access network to use in conjunction with barometric sensor information measured by the UE 102. In some embodiments, the WLAN/WPAN AP information is communicated to the UE 102 via one or more of: a measurements control message, an assistance data message, and a system information block (SIB) message. In some embodiments, the WLAN/WPAN AP information include one or more of: a service set identifier (SSID), a frequency band, a frequency channel, a transmit power level, and an antenna gain. In step 906, the UE 102 determines a location estimate for itself based at least in part on WLAN/WPAN AP measurements. In some embodiments, the WLAN/WPAN AP measurements used to determine the location estimate of the UE 102 includes measurements of one or more WLAN/WPAN APs performed by the UE 102 based on the WLAN/WPAN AP information received by the UE 102 from the network element of the wireless access network. In some embodiments, the UE 102 obtains barometric sensor measurements for the UE 102 at its current location (and/or from stored measured barometric sensor information stored in the UE 102) and uses the measured barometric sensor information alone or in combination with barometric reference data provided by the wireless network to estimate a vertical location of the UE 102. In step 908, the UE 102 provides the location estimate of the UE 102 to the network element of the wireless access network. In some embodiments, the location estimate of the UE 102 is provided to the network element of the wireless access network in a measurements report message. In some embodiment, the UE 102 provides at least a portion of the WLAN/WPAN AP measurements to the network element of the wireless access network in addition to or in place of the location estimate of the UE 102. In some embodiments, the UE 102 also provides barometric sensor information to the network element to use in estimating a vertical location of the UE 102. When the UE 102 provides WLAN/WPAN AP measurements (possibly also including GPS/GNSS information and/or barometric information) to the network element of the wireless network, in some embodiments, the network element, alone or in conjunction with one or more other network elements of a wireless network, estimates a location for the UE 102 based at least in part on the provided WLAN/WPAN AP measurements (possibly also based on GPS/GNSS information and/or barometric information provided by the UE 102).

Figure 10:
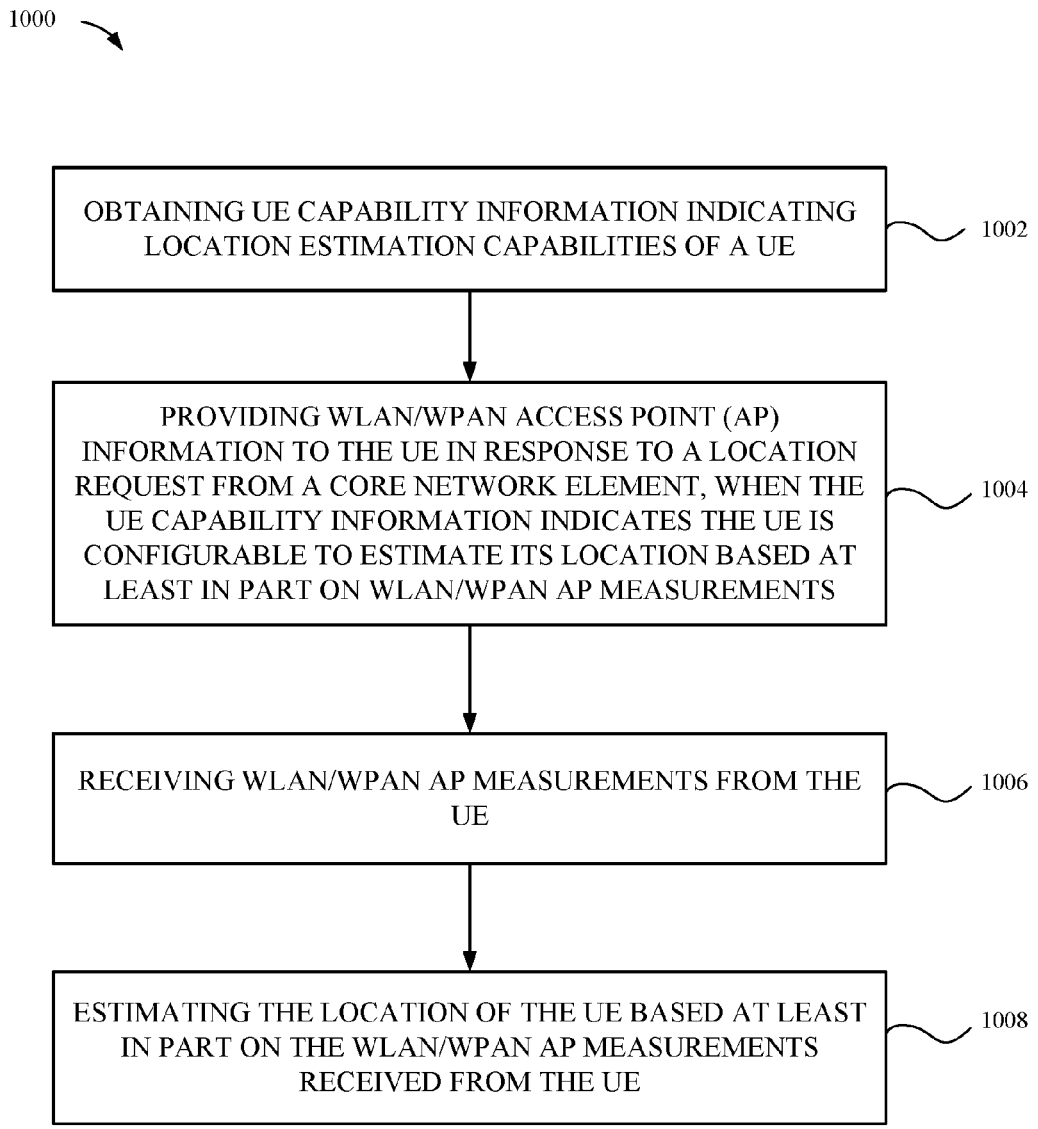
FIG. 10 illustrates a flowchart depicting an example method by an access network element of a cellular network for estimating a location of a wireless communication device based at least in part on a combination of one or more of: wireless local area network (WLAN) access point (AP) measurements, wireless personal area network (WPAN) measurements, or barometric sensor measurements, in accordance with some embodiments.

FIG. 10 illustrates a flowchart 1000 of a representative method by an access network element of a cellular wireless network, e.g., SRNC 106, to estimate a location of a wireless communication device, e.g., UE 102, based at least in part on WLAN/WPAN AP measurements. In some embodiments, the access network element is a UTRAN of a cellular wireless network operating in accordance with a UMTS wireless communications protocol. In step 1002, the access network element obtains capability information for the UE 102, such as in response to a capabilities inquiry message sent to the UE 102 by the SRNC 106 via NodeB 104. In some embodiments, the capability information obtained from the UE 102 includes an indication about whether the UE 102 is configurable to estimate its location based at least in part on WLAN/WPAN AP measurements. In step 1004, the access network element provides to the UE 102, in response to receipt of a location request from a core network element, a set of WLAN/WPAN AP information, when the UE capability information received from the UE 102 indicates that the UE 102 is configurable to estimate its location based at least in part on WLAN/WPAN AP measurements. In step 1006, the access network element receives WLAN/WPAN AP measurements from the UE 102. In step 1008, the access network element estimates a location of the UE 102 based at least in part on the WLAN/WPAN AP measurements received from the UE 102. In some embodiments, the access network element provides at least a portion of the WLAN/WPAN AP measurements to a stand-alone serving location mobile center, e.g., SAS 114, and receives from the stand-alone serving location mobile center a location estimate of the UE 102. In some embodiments, the stand-alone serving location mobile center estimates the location of the UE 102 based at least in part on the WLAN/WPAN AP measurements provided by the access network element from the UE 102. In some embodiments, the stand-alone serving location mobile center estimates the location of the UE 102 based at least in part on additional WLAN/WPAN AP mapping information obtained from a database. In some embodiments, the access network element provides the estimated location of the UE 102 to the core network element from which the location request was received.

Figure 11:
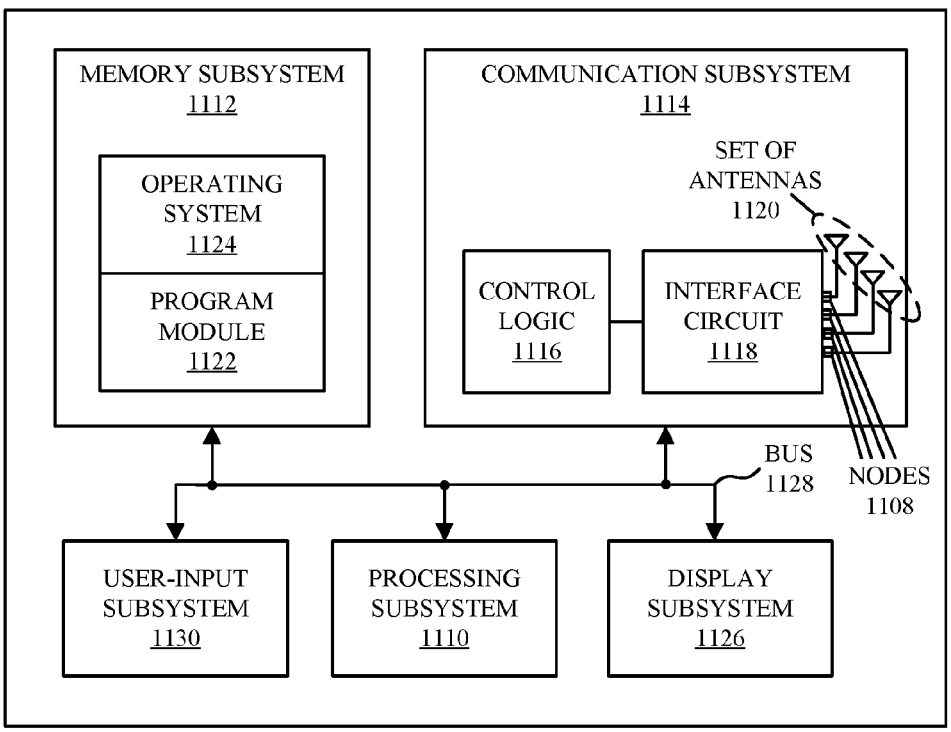
FIG. 11 illustrates a detailed view of an exemplary computing device that can be used to implement at least a portion of the various techniques described herein, in accordance with some embodiments.

FIG. 11 presents a block diagram of a representative electronic device 1100, which can be UE 102, in accordance with some embodiments. This electronic device 1100 includes processing subsystem 1110, memory subsystem 1112, and communication subsystem 1114. Processing subsystem 1110 includes one or more devices configured to perform computational operations. For example, processing subsystem 1110 can include one or more microprocessors, application-specific integrated circuits (ASICs), microcontrollers, programmable-logic devices, and/or one or more digital signal processors (DSPs). In some embodiments, processing subsystem 1110 can represent all or portions of processors 812, location determination module 818, and/or processing circuitry 810 of FIG. 8.

Memory subsystem 1112 includes one or more devices for storing data and/or instructions for processing subsystem 1110 and communication subsystem 1114. For example, memory subsystem 1112 can include dynamic random access memory (DRAM), static random access memory (SRAM), a read-only memory (ROM), flash memory, and/or other types of memory. In some embodiments, instructions for processing subsystem 1110 in memory subsystem 1112 include: one or more program modules or sets of instructions (such as program module 1122 or operating system 1124), which may be executed by processing subsystem 1110. For example, a ROM can store programs, utilities or processes to be executed in a non-volatile manner, and DRAM can provide volatile data storage, and may store instructions related to the operation of the electronic device. Note that the one or more computer programs may constitute a computer-program mechanism or software. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110. In some embodiments, the one or more computer programs are distributed over a network-coupled computer system so that the one or more computer programs are stored and executed in a distributed manner. In some embodiments, memory subsystem 1112 can represent all or portions of processing circuitry 810, location determination module 818, and/or memory 814 of FIG. 8.

In addition, memory subsystem 1112 can include mechanisms for controlling access to the memory. In some embodiments, memory subsystem 1112 includes a memory hierarchy that comprises one or more caches coupled to a memory in the electronic device. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by the electronic device as fast-access storage for often-used data, while the mass-storage device is used to store less frequently used data.

Communication subsystem 1114 includes one or more devices configured to couple to and communicate on a wired and/or wireless network (e.g., to perform network operations), including: control logic 1116, an interface circuit 1118 and a set of antennas 1120 (or antenna elements) in an adaptive array that can be selectively turned on and/or off by control logic 1116 to create a variety of optional antenna patterns or 'beam patterns.' (While FIG. 11 includes set of antennas 1120, in some embodiments the electronic device 1100 includes one or more nodes, such as nodes 1108, e.g., a pad, which can be coupled to set of antennas 1120. Thus, the electronic device 1100 may or may not include set of antennas 1120.) For example, communication subsystem 1114 can include a Bluetooth™ communication system, a cellular communication system (e.g., for communication with a 3G/4G network such as UMTS, LTE, etc.), a universal serial bus (USB) communication system, a communication system based on the standards described in IEEE 802.11 (e.g., a Wi-Fi® communication system), an Ethernet communication system, and/or another communication system.

Communication subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on a network for each communication system are sometimes collectively referred to as a 'network interface' for the communication system. Moreover, in some embodiments a 'network' or a 'connection' between the electronic devices does not yet exist. Therefore, the electronic device 1100 may use the mechanisms in communication subsystem 1114 for performing simple wireless communication between the electronic devices, e.g., transmitting advertising or beacon frames and/or scanning for advertising frames transmitted by other electronic devices. In some embodiments, communication subsystem 1114 can represent all or portions of wireless circuitry 816 of FIG. 8.

Within the electronic device 1100, processing subsystem 1110, memory subsystem 1112, and communication subsystem 1114 are coupled together using bus 1128 that facilitates data transfer between these components. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, the electronic device 1100 includes a display subsystem 1126 for displaying information on a display, which may include a display driver and the display, such as a liquid-crystal display, a multi-touch touchscreen, etc. Display subsystem 1126 may be controlled by processing subsystem 1110 to display information to a user (e.g., information relating to incoming, outgoing, or an active communication session).

The electronic device 1100 can also include a user-input subsystem 1130 that allows a user of the electronic device 1100 to interact with the electronic device 1100. For example, user-input subsystem 1130 can take a variety of forms, such as: a button, keypad, dial, touch screen, audio input interface, visual/image capture input interface, input in the form of sensor data, etc.

The electronic device 1100 can be (or can be included in) any electronic device 1100 with at least one communication/network interface. For example, the electronic device 1100 may include: a cellular telephone or a smartphone, a tablet computer, a laptop computer, a notebook computer, a personal or desktop computer, a netbook computer, a media player device, an electronic book device, a MiFi® device, a smart watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1100, in alternative embodiments, different components and/or subsystems may be present in the electronic device 1100. For example, the electronic device 1100 may include one or more additional processing subsystems, memory subsystems, networking subsystems, and/or display subsystems. Additionally, one or more of the subsystems may not be present in the electronic device 1100. Moreover, in some embodiments, the electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in the electronic device 1100. For example, in some embodiments program module 1122 is included in operating system 1124 and/or control logic 1116 is included in interface circuit 1118.

Moreover, the circuits and components in the electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of communication subsystem 1114. This integrated circuit may include hardware and/or software mechanisms that are used for transmitting wireless signals from the electronic device 1100 and receiving signals at the electronic device 1100 from other electronic devices. Aside from the mechanisms herein described, radios are generally known in the art and hence are not described in detail. In general, communication subsystem 1114 and/or the integrated circuit can include any number of radios. Note that the radios in multiple-radio embodiments function in a similar way to the described single-radio embodiments.

In some embodiments, communication subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises a trigger, providing a trigger response, etc.).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a wireless communication protocol as an illustrative example, in other embodiments a wide variety of communication protocols and, more generally, wireless and/or wired communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1122, operating system 1124 (such as a driver for interface circuit 1118) or in firmware in interface circuit 1118. Alternatively or additionally, at least some of the operations in the communication technique may be implemented in a physical layer, in a MAC layer, and/or in higher layers, such as implemented in a combination of hardware, software, and/or firmware in interface circuit 1118.

In the preceding description, we refer to 'some embodiments.' Note that 'some embodiments' describes a subset of all of the possible embodiments, but does not always specify the same subset of embodiments.

The various aspects, embodiments, implementations or features of the described embodiments can be used separately or in any combination. Further, some aspects of the described embodiments may be implemented by software, by hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

REFERENCES

The following wireless standards documents are incorporated by reference herein in their entirety for all purposes: 3GPP TS 25.215: "Physical layer—Measurements (FDD)" [Reference 7]; 3GPP TS 25.133: "Requirements for Support of Radio Resource Management (FDD)" [Reference 19]; 3GPP TS 25.413: "UTRAN Iu Interface RANAP Signalling" [Reference 57]; IEEE 802.11, Part 11: "Wireless LAN Medium Access Control (MAC) and Physical Layer (PHY) specifications" [Reference 87]; and Bluetooth Special Interest Group: "Bluetooth Core Specification v4.2", December 2014 [Reference 89].

Abbreviations

Some or all of the following abbreviations may be used in this Application.
ACK Acknowledgement
AG Absolute Grant
AICH Acquisition Indicator CHannel
AM Acknowledged Mode
ANDSF Access Network Discovery and Selection Function
ANR Automatic Neighbour Relation
AP Access Point
AS Access Stratum
ASC Access Service Class
ASN.1 Abstract Syntax Notation.1
BCCH Broadcast Control Channel
BCD Binary Coded Decimal
BCFE Broadcast Control Functional Entity
BDS BeiDou Navigation Satellite System
BER Bit Error Rate
BLER BLock Error Rate
BSS Base Station Sub-system
BT Bluetooth
CCCH Common Control Channel
CCPCH Common Control Physical CHannel
CH Conditional on history
CLTD Closed Loop Transmit Diversity
CM Connection Management
CN Core Network
C-RNTI Cell RNTI
CSFB CS Fallback
CSG Closed Subscriber Group
CTCH Common Traffic CHannel
CTFC Calculated Transport Format Combination
CV Conditional on value
DBDS Differential BDS
DCA Dynamic Channel Allocation
DCCH Dedicated Control Channel
DCFE Dedicated Control Functional Entity
DCH Dedicated Channel
DC-SAP Dedicated Control SAP
DDI Data Description Indicator
DGANSS Differential GANSS
DGPS Differential Global Positioning System
DL Downlink
DPCCH2 Dedicated Physical Control Channel 2
DSCH Downlink Shared Channel
DTCH Dedicated Traffic Channel
DTM Dual Transfer Mode
EAB Extended Access Barring
E-AGCH E-DCH Absolute Grant Channel
ECEF Earth-Centered, Earth-Fixed
ECI Earth-Centered-Inertial
E-DCH Enhanced uplink DCH
E-DPCCH E-DCH Dedicated Physical Control Channel (FDD Only)
E-DPDCH E-DCH Dedicated Physical Data Channel (FDD Only)
EGNOS European Geostationary Navigation Overlay Service
E-HICH E-DCH HARQ Acknowledgement Indicator Channel
E-PUCH Enhanced Uplink Physical Channel (TDD only)
E-RGCH E-DCH Relative Grant Channel (FDD only)
E-RNTI E-DCH RNTI
E-ROCH E-DCH Rank and Offset Channel (FDD only)
E-RUCCH E-DCH Random Access Uplink Control Channel (TDD only)
E-TFCI E-DCH Transport Format Combination Indicator ETWS Earthquake and Tsunami Warning System
E-UCCH E-DCH Uplink Control Channel (TDD only)
E-UTRA Evolved Universal Terrestrial Radio Access
E-UTRAN Evolved Universal Terrestrial Radio Access Network
FACH Forward Access Channel
FDD Frequency Division Duplex
F-DPCH Fractional DPCH
F-TPICH Fractional Transmitted Precoding Indicator Channel
GAGAN GPS Aided Geo Augmented Navigation
GANSS Galileo and Additional Navigation Satellite Systems
GC-SAP General Control SAP
GERAN GSM/EDGE Radio Access Network
GLONASS GLObal'naya NAvigatsionnaya Sputnikovaya Sistema (Engl.: Global Navigation Satellite System)
GNSS Global Navigation Satellite System
GRA GERAN Registration Area
G-RNTI Geran Radio Network Temporary Identity
HARQ Hybrid Automatic Repeat Request
HCS Hierarchical Cell Structure
HFN Hyper Frame Number
H-RNTI HS-DSCH RNTI
HS-DSCH High Speed Downlink Shared Channel
ICD Interface Control Document
ID Identifier
IDNNS Intra Domain NAS Node Selector
IE Information element
IETF Internet Engineering Task Force
IMB Integrated Mobile Broadcast
IMEI International Mobile Equipment Identity
IMSI International Mobile Subscriber Identity
IP Internet Protocol
ISCP Interference on Signal Code Power
L1 Layer 1
L2 Layer 2
L3 Layer 3
LAI Location Area Identity
MAC Media Access Control
MBMS Multimedia Broadcast Multicast Service
MB SFN MBMS over a Single Frequency Network
MCC Mobile Country Code
MCCH MBMS point-to-multipoint Control Channel
MD Mandatory default
MDT Minimization of Drive Tests
MICH MBMS notification Indicator Channel
MM Mobility Management
MNC Mobile Network Code
MP Mandatory present
MTCH MBMS point-to-multipoint Traffic Channel
MSAS Multi-functional Satellite Augmentation System
MSCH MBMS point-to-multipoint Scheduling Channel
NACC Network Assisted Cell Change
NAS Non Access Stratum
Nt-SAP Notification SAP
NW Network
OLTD Open Loop Transmit Diversity
OP Optional
PCCH Paging Control Channel
PCH Paging Channel
PDCP Packet Data Convergence Protocol
PDSCH Physical Downlink Shared Channel
PDU Protocol Data Unit
PLMN Public Land Mobile Network
PNFE Paging and Notification Control Functional Entity
PRACH Physical Random Access CHannel
PRN Pseudo-Random Noise
PSI Packet System Information
p-t-m Point-to-Multipoint
P-TMSI Packet Temporary Mobile Subscriber Identity
p-t-p Point-to-Point
PUSCH Physical Uplink Shared Channel
QoS Quality of Service
QZSS Quasi-Zenith Satellite System
RAB Radio access bearer
RACH Random Access CHannel
RAI Routing Area Identity
RAT Radio Access Technology
RB Radio Bearer
RFE Routing Functional Entity
RG Relative Grant
RL Radio Link
RLC Radio Link Control
RLS Radio Link Set
RNC Radio Network Controller
ROHC RObust Header Compression
RNTI Radio Network Temporary Identifier
RRC Radio Resource Control
RSCP Received Signal Code Power
RSN Retransmission Sequence Number
RSRP Reference Signal Received Power
RSRQ Reference Signal Received Quality
RSSI Received Signal Strength Indicator
SAP Service Access Point
SBAS Satellite Based Augmentation System
SCFE Shared Control Function Entity
SCTD Space Code Transmit Diversity
SCTO Soft Combining Timing Offset (MBMS)
S-DPCCH Secondary Dedicated Physical Control Channel
S-E-DPCCH Secondary E-DPCCH (FDD only)
S-E-DPDCH Secondary E-DPDCH (FDD only)
SF Spreading Factor
SG Serving grant
SHCCH Shared Control Channel
SI System Information
SIR Signal to Interference Ratio
SPS Semi-Persistent Scheduling
S-RNTI SRNC-RNTI
SV Space Vehicle
TDD Time Division Duplex
TF Transport Format
TFCS Transport Format Combination Set
TFS Transport Format Set
TM Transparent Mode
TME Transfer Mode Entity
TMSI Temporary Mobile Subscriber Identity
Tr Transparent
TSN Transmission Sequence Number
Tx Transmission
UE User Equipment
UL Uplink
UM Unacknowledged Mode
URA UTRAN Registration Area
U-RNTI UTRAN-RNTI
USCH Uplink Shared Channel
UTC Universal Coordinated Time
UTRAN Universal Terrestrial Radio Access Network
WAAS Wide Area Augmentation System
WGS-84 World Geodetic System 1984
WLAN Wireless Local Area Network
3GPP TS 25.331 Proposed Changes 3GPP TS 25.331 Section 8.5.65.2 entitled "Initiation" can be modified to include WLAN, WPAN (e.g., BT), and/or Sensor location information in a logging procedure as follows.

While T326 is running, the UE shall:
1> perform this logging in accordance with the following:
  2> perform the logging while camping normally on an UTRA cell and the RPLMN of the UE is present in the "PLMN Identity List" stored in LOGGED_MEAS_REPORT_VARIABLE and, if the IE "Area Configuration" is present in variable LOGGED_MEAS_CONFIG, that is part of the concerned area;
  2> perform the logging at regular intervals, as defined by the IE "Logging Interval" in variable LOGGED_MEAS_CONFIG;
  2> when adding a logged measurement entry in variable LOGGED_MEAS_REPORT_VARIABLE, include the fields in accordance with the following:
    3> set the IE "Relative Time Stamp" to indicate time relative to the moment at which the logged measurement configuration was received;
    3> if GNSS, Sensor or WLAN/BT location information became available during the last logging interval:
      4> if the UE has been able to calculate a 3-dimensional position:
        5> set IE "Ellipsoid point with altitude" or the IE "Ellipsoid point with altitude and uncertainty ellipsoid" to include the location coordinates;
      4> else:
        5> set IE "Ellipsoid point" or the IE "Ellipsoid point with uncertainty circle" or the IE "Ellipsoid point with uncertainty ellipse" to include the location coordinates:
      4> a value of the IE "Confidence", different from "0" should be calculated, as the probability that the UE is located within the uncertainty region of the one of the IEs "Ellipsoid point with uncertainty ellipse" or "Ellipsoid point with altitude and uncertainty ellipsoid".
    3> set the IE "PLMN Identity" of the Logged Measurements Serving Cell to indicate the PLMN Identity of the cell the UE is camping on obtained from system information;
    3> set the IE "Cell ID" to indicate cell identity of the cell the UE is camping on obtained from system information;
    3> set the IE "CPICH Ec/N0" and "CPICH RSCP" to include measured quantities of the cell that the UE is camping on for UTRA FDD;
    3> set the "P-CCPCH RSCP" to include measured quantities for the cell that the UE is camping on for UTRA 1.28 Mcps TDD;
    3> set the IE "Logged Measurements Intra Frequency Neighbouring Cells list", "Logged Measurements Inter Frequency list", "Logged Measurements E-UTRA frequency list", "Logged Measurements E-UTRA frequency extension list", in order of decreasing ranking quantity as used for cell re-selection in each frequency for at most the following number of neighbouring cells; 6 intra-frequency and 3 inter-frequency neighbours per frequency as well as 3 inter-RAT neighbours, per frequency per RAT;
    3> set the IE "Logged Measurements GSM Neighbouring Cells list" in order of decreasing RXLEV.

NOTE: The UE includes, only once, the latest available results of the measurement performed for cell reselection, which are performed in accordance with the regular performance requirements as specified in [Reference 19].
  2> when the memory reserved for the logging of measurements becomes full, stop timer T326 and performs the same actions as performed upon expiry of T326, as specified in 8.5.63.4.

3GPP TS 25.331 Section 8.6.7.19.0 entitled "UE positioning reporting criteria" can be modified to include an "Indoor Method Type" Information Element (IE) for UE positioning reporting as follows.

If IE "UE positioning reporting criteria" is included, the UE shall:
1> perform the necessary measurements and evaluate the event in the interval indicated in IE "Measurement Interval";
1> if IE "Event ID" is set to "7a" and if IE "Report first fix" is set to TRUE:
  2> if the IE "Method Type" included in the variable MEASUREMENT_IDENTITY is set to "UE based":
    3> act as specified in subclause 8.6.7.19.1b.
  2> if the IE "Indoor Method Type" included in the variable MEASUREMENT_IDENTITY is set to "standalone":
    3> act as specified in subclause 8.6.7.19.1b.

3GPP TS 25.331 Section 8.6.7.19.1b entitled "UE positioning reporting for UE based methods" can be modified to include an indoor standalone positioning method for UE positioning reporting as follows.

The UE shall:
1> when a measurement report is triggered:
  2> if the UE has been able to calculate a position after performing measurements on the cells included in the variable UE POSITIONING OTDOA DATA UE BASED in case of OTDOA or the UE has been able to calculate a position in case of GPS or GANSS positioning or the UE has been able to calculate a position using a standalone positioning method or the UE has been able to calculate a position using indoor standalone positioning method:
    3> include IE "UE positioning Position Estimate Info" in the MEASUREMENT REPORT and set the contents of the IE as follows:
      4> if the UE supports the capability to perform the UE GPS timing of cell frames measurement:
        5> if the IE "GPS timing of Cell wanted" is set to TRUE:
          6> perform the UE GPS timing of cell frames measurement on the serving cell or on one cell of the active set.
          6> include the IE "Primary CPICH Info" for FDD or the IE "cell parameters id" for TDD;
          6> include the SFN when the position was determined;
          6> include the IE "UE GPS timing of cell frames";
          6> include the IE "UE Positioning GPS Reference Time Uncertainty".
        5> if the IE "GPS timing of Cell wanted" is set to FALSE:
          6> include the IE "GPS TOW msec" and set it to the GPS TOW when the position estimate was valid.
      4> if the position was calculated with GPS; and 4> the UE does not support the capability to provide the GPS timing of the cell:
　5> include the IE "GPS TOW msec" and set it to the GPS TOW when the position estimate was valid.
4> if the UE supports the capability to provide the GANSS timing of the cell frames measurement:
　5> if the IE "GANSS timing of Cell wanted" is included with one bit set to value one for a supported GANSS:
　　6> perform the UE GANSS timing of cell frames measurement on the serving cell or on one cell of the active set;
　　6> include the IE "GANSS Time ID" to identify the GNSS system time;
　　6> include the IE "Primary CPICH Info" for FDD or the IE "cell parameters id" for TDD; and
　　6> include the IE "Reference SFN" and the IE "UE GANSS timing of cell frames".
　5> if the IE "GANSS timing of Cell wanted" is not included, or included with each bit set to value zero:
　　6> include the IE "GANSS TOD msec" and set it to the GANSS TOD when the position estimate was valid.
4> if the UE does not support the capability to provide the GANSS timing of the cell:
　5> include the IE "GANSS TOD msec" and set it to the GANSS TOD when the position estimate was valid;
　5> include the IE "GANSS Time ID" to identify the GNSS system time.
4> if IE "Vertical Accuracy" has been included in IE "UE positioning reporting quantity":
　5> if the IE "Vertical Accuracy" has been assigned to value "0":
　　6> if the IE "Horizontal Accuracy" has been assigned a value "0":
　　　7> may include IE "Ellipsoid point with altitude".
　　6> if the IE "Horizontal Accuracy" has been assigned a value unequal to "0"; and
　　6> if the UE has been able to calculate a 3-dimensional position
　　　7> include IE "Ellipsoid point with altitude" or IE "Ellipsoid point with altitude and uncertainty ellipsoid" as the position estimate.
　　6> if the UE has not been able to calculate a 3-dimensional position:
　　　7> may act as if IE "Vertical Accuracy" was not included in IE "UE positioning reporting quantity".
　5> if the IE "Vertical Accuracy" has been assigned to a value unequal to "0":
　　6> if the UE has been able to calculate a 3-dimensional position:
　　　7> include IE "Ellipsoid point with altitude and uncertainty ellipsoid" as the position estimate.
　　6> if the UE has not been able to calculate a 3-dimensional position:
　　　7> act as if IE "Vertical Accuracy" has not been included in IE "UE positioning reporting quantity".
4> if IE "Vertical Accuracy" has not been included in IE "UE positioning reporting quantity":
　5> if IE "Horizontal Accuracy" in IE "UE positioning reporting quantity" has been assigned to value "0":
　　6> may include IE "Ellipsoid point".
　5> if IE "Horizontal Accuracy" in IE "UE positioning reporting quantity" has been assigned to a value unequal to 0:
　　6> include either IE "Ellipsoid point with uncertainty circle" or IE "Ellipsoid point with uncertainty ellipse" or IE "Ellipsoid point with altitude and uncertainty ellipsoid" as the position estimate.
4> if any of the IEs "Ellipsoid point with uncertainty ellipse" or "Ellipsoid point with altitude and uncertainty ellipsoid" is reported:
　5> should calculate a value of the IE "Confidence", different from "0", as the probability that the UE is located within the uncertainty region of the one of the IEs "Ellipsoid point with uncertainty ellipse" or "Ellipsoid point with altitude and uncertainty ellipsoid" that is reported.

NOTE: The value "0" of the IE "Confidence" is interpreted as "no information" by the UTRAN [Reference 57].

4> if IE "Velocity Requested" has been included in IE "UE positioning reporting quantity":
　　　5> include IE "Velocity estimate" if supported and available.
　2> if the UE was not able to calculate a position:
　　3> include IE "UE positioning error" in the MEASUREMENT REPORT and set the contents of this IE as specified in subclause 8.6.7.19.5.
1> if the UE is unable to calculate a position due to missing GPS assistance data:
　2> the UE may at any time send a measurement report containing the IE "UE positioning error" and set the contents of this IE as specified in subclause 8.6.7.19.5;
　2> after sending the measurement report, the UE shall not send another measurement report to request the same GPS assistance data for at least 20 s. This requirement does not apply after release of the current RRC connection.
1> if the UE is unable to report the requested measurement results due to missing GANSS assistance data:
　2> the UE may at anytime send a measurement report containing the IE "UE positioning error" and set the contents of this IE as specified in subclause 8.6.7.19.5;
　2> after sending the measurement report, the UE shall not send another measurement report to request the same GANSS assistance data for at least 20 s. This requirement does not apply after release of the current RRC connection.

3GPP TS 25.331 Section 10.3.3.45 entitled "UE positioning capability" can be modified to include support for WLAN, WPAN (e.g., BT), and/or Sensors for location estimation as listed in the following set of tables.

| Information Element/ Group name | Need | Multi | Type and reference | Semantics description | Version |
|---|---|---|---|---|---|
| Standalone location method(s) supported | MP | | Boolean | Defines if a UE can measure its location by some means unrelated to UTRAN<br>TRUE means supported | |
| UE based OTDOA supported | MP | | Boolean | TRUE means supported | |
| Network Assisted GPS support | MP | | Enumerated ('Network based', 'UE based', 'Both', 'None') | Defines if the UE supports network based or UE based GPS methods. | |
| Network Assisted GANSS support List | CV-not_iRAT_HoInfo | 1 to <maxGANSS> | | Absent if GANSS is not supported | REL-7 |
| >GANSS ID | OP | | Enumerated( | Absence of this IE means Galileo. Eight spare values needed. | REL-7 |
| | | | SBAS, Modernized_GPS, QZSS, GLONASS, | Absence of this IE means Galileo. Four spare values needed. | REL-8 |
| | | | BDS) | Absence of this IE means Galileo. Three spare values needed. | REL-12 |
| >SBAS IDs | CV-GANSS-ID-SBAS | | Bit String(8) | Defines the specific SBAS(s) supported. This is represented using a bit string with one bit per SBAS as defined in NOTE 1 where a one value indicates support and a zero value no support. | REL-8 |
| >GANSS mode | MP | | Enumerated ('Network based', 'UE based', 'Both', 'None') | Defines if the UE supports network based or UE based GANSS methods | REL-7 |
| >GANSS Signal ID | OP | | 10.3.3.45a | Absence of this field means the default value as defined in 10.3.3.45a for the GANSS identified by GANSS ID. | REL-7 |
| >GANSS Signal IDs | OP | | Bit String(8) | Defines if a UE has the capability to perform measurements on more than one GANSS signal and which signals are supported. This is represented using a bit string with one bit per signal as defined in NOTE 2 where a one value indicates support and a zero value no support. | REL-8 |
| >Support for GANSS timing of cell frames measurement | MP | | Boolean | Defines if a UE has the capability to perform the UE GANSS timing of cell frames measurement.<br>TRUE means capable | REL-7 |
| >Support for GANSS Carrier-Phase Measurement | OP | | Boolean | Defines if a UE has the capability to perform the UE GANSS Carrier-Phase Measurement.<br>TRUE means capable | REL-7 |
| >Support for non-native assistance choices | OP | | Enumerated (TRUE) | Absence of this element means not supported and presence means the UE supports assistance data choices in formats not defined in the ICD of a particular GANSS. Multiple choices exist for assistance data elements defined in 10.3.7.89a, 10.3.7.94a/b, 10.3.7.97d. | REL-8 |
| GANSS support indication | CV-iRAT_HoInfo | | Enumerated (TRUE) | TRUE indicates that the UE supports GANSS | REL-7 |
| Support for GPS timing of cell frames measurement | MP | | Boolean | Defines if a UE has the capability to perform the UE GPS timing of cell frames measurement [Reference 7].<br>TRUE means capable | |
| Support for IPDL | MP | | Boolean | Defines if a UE has the capability to use IPDL to enhance its 'SFN – SFN observed time difference -type 2' measurement.<br>TRUE means supported | |
| Support for Rx – Tx time difference type2 measurement | MP | | Boolean | TRUE means supported | |
| Support for UP assisted GPS measurement validity in CELL_PCH and URA_PCH states | CV-GPSsupported | | Enumerated (TRUE) | | |

-continued

| Information Element/ Group name | Need | Multi | Type and reference | Semantics description | Version |
|---|---|---|---|---|---|
| Support for SFN – SFN observed time difference type 2 measurement | OP | | Enumerated (TRUE) | Absence of this element means not supported and presence means supported. | |
| WLAN-BT supported | MP | | Enumerated ('standalone', 'UE assisted', 'Both', 'None') | Defines if the UE supports standalone or UE-assisted WLAN/BT | REL-13 |
| >WLAN-BT supported measurements in "UE-assisted" mode | MP | | Bit String(8) ('rssi', 'rtt', 'Both', 'None') | Defines the specific measurements supported. This is represented using a bit string, where a one value indicates support and a zero value no support. | REL-13 |
| Sensors supported | MP | | Enumerated ('standalone', 'UE assisted', 'Both', 'None') | Defines if the UE supports standalone or UE-assisted pressure sensors | REL-13 |

| Condition | Explanation |
|---|---|
| GPSsupported | This IE is mandatory present if the IE "Network Assisted GPS support" is set to 'Network based', 'UE based' or 'Both'. Otherwise, it is not needed. |
| not_iRAT_HoInfo | These IEs are not needed in the INTER RAT HANDOVER INFO message. Otherwise, they are optionally present. |
| iRAT_HoInfo | This IE is optionally present in the INTER RAT HANDOVER INFO message. Otherwise, the IE is not needed. |
| GANSS-ID-SBAS | This IE is mandatory present if the IE "GANSS ID" is "SBAS" and not needed otherwise. |

NOTE 1: Coding of SBAS IDs:

SBAS IDs Bit String(8)

| Bit 1 (MSB) | Bit 2 | Bit 3 | Bit 4 | Bit 5 | Bit 6 | Bit 7 | Bit 8 (LSB) |
|---|---|---|---|---|---|---|---|
| WAAS | EGNOS | MSAS | GAGAN | — | — | — | — |

NOTE 2: Coding of GANSS Signal IDs:

GANSS Signal IDs Bit String(8)

| GANSS | Bit 1 (MSB) | Bit 2 | Bit 3 | Bit 4 | Bit 5 | Bit 6 | Bit 7 | Bit 8 (LSB) |
|---|---|---|---|---|---|---|---|---|
| Galileo | E1 | E5a | E5b | E6 | E5a + E5b | — | — | — |
| Modernized GPS | L1C | L2C | L5 | — | — | — | — | — |
| SBAS | L1 | — | — | — | — | — | — | — |
| QZSS | QZS-L1 | QZS-L1C | QZS-L2C | QZS-L5 | — | — | — | — |
| GLONASS | G1 | G2 | G3 | — | — | — | — | — |
| BDS | B1I | — | — | — | — | — | — | — |

3GPP TS 25.331 Section 10.3.7.99 entitled "UE positioning measured results" can be modified to include support for WLAN, WPAN (e.g., BT), and/or Sensors for location estimation as listed in the following table.

| Information Element/ Group name | Need | Multi | Type and reference | Semantics description | Version |
|---|---|---|---|---|---|
| UE positioning OTDOA measured results | OP | | | UE positioning OTDOA measured results 10.3.7.105 | |
| UE positioning Position estimate info | OP | | | UE positioning Position estimate info 10.3.7.109 | |
| UE positioning GPS measured results | OP | | | UE positioning GPS measured results 10.3.7.93 | |

-continued

| Information Element/ Group name | Need | Multi | Type and reference | Semantics description | Version |
|---|---|---|---|---|---|
| UE positioning error | OP | | UE positioning error 10.3.7.87 | Included if UE positioning error occurred | |
| UE positioning GANSS measured results | OP | | UE positioning GANSS measured results 10.3.7.93a | | REL-7 |
| UE positioning WLAN/BT measured results | OP | | UE positioning WLAN/BT measured results 10.3.7.141 | | REL-13 |
| UE positioning Sensor measured results | OP | | UE positioning Sensor measured results 10.3.7.142 | | REL-13 |

3GPP TS 25.331 Section 10.3.7.101 entitled "UE positioning measurement event results" can be modified to include support for WLAN, WPAN (e.g., BT), and/or Sensors for location estimation as listed in the following table. The Information Element (IE) of this table contains measurement event results that are reported to UTRAN for UE positioning measurements.

| Information Element/ Group name | Need | Multi | Type and Reference | Semantics description | Version |
|---|---|---|---|---|---|
| CHOICE Event ID >7a | MP | | | One spare value is needed. | |
| >>UE positioning Position estimate info >7b | MP | | UE positioning Position estimate info 10.3.7.109 | | |
| >>UE positioning OTDOA measured results >7c | MP | | UE positioning OTDOA measured results 10.3.7.105 | | |
| >>UE positioning GPS measurement >7d | MP | | UE positioning GPS measured results 10.3.7.93 | | |
| >>UE positioning GANSS measurement >7e | MP | | UE positioning GANSS measured results 10.3.7.93a | | |
| UE positioning WLAN/BT measured results >7f | OP | | UE positioning WLAN/BT measured results 10.3.7.141 | | REL-13 |
| UE positioning Sensor measured results | MP | | UE positioning Sensor measured results 10.3.7.142 | | REL-13 |

3GPP TS 25.331 Section 10.3.7.109 entitled "UE positioning position estimate info" can be modified to include support for WLAN, WPAN (e.g., BT), and/or Sensors for location estimation as listed in the following table. This Information Element (IE) of this table provides details for a position estimate from the UE to the network, if the UE is capable of determining its own position.

| Information Element/ Group name | Need | Multi | Type and Reference | Semantics description | Version |
|---|---|---|---|---|---|
| CHOICE Reference Time >UTRAN GPS reference time | MP | | | | |

-continued

| Information Element/ Group name | Need | Multi | Type and Reference | Semantics description | Version |
|---|---|---|---|---|---|
| >>UE GPS timing of cell frames | MP | | Integer(0 . . . 37158911999999) | GPS Time of Week in units of $^1\!/_{16}{}^{th}$ UMTS chips according to [Reference 19]. 33209832177664 spare values are needed. | |
| >>CHOICE mode | MP | | | | |
| >>>FDD | | | | | |
| >>>>Primary CPICH Info | MP | | Primary CPICH Info 10.3.6.60 | Identifies the reference cell for the GPS TOW-SFN relationship | |
| >>>TDD | | | | | |
| >>cell parameters id | MP | | Cell parameters id 10.3.6.9 | Identifies the reference cell for the GPS TOW-SFN relationship. | |
| >>Reference SFN | MP | | Integer(0 . . . 4095) | The SFN for which the location is valid. This IE indicates the SFN at which the UE timing of cell frame is captured. | |
| >GPS reference time only | | | | | |
| >>GPS TOW msec | MP | | Integer(0 . . . $6.048*10^8 - 1$) | GPS Time of Week in milliseconds (rounded down to the nearest millisecond unit). | |
| >Cell timing | | | | | |
| >>SFN | MP | | Integer(0 . . . 4095) | SFN during which the position was calculated. | |
| >>CHOICE mode | MP | | | | |
| >>>FDD | | | | | |
| >>>>Primary CPICH Info | MP | | Primary CPICH Info 10.3.6.60 | Identifies the reference cell for SFN | |
| >>>TDD | | | | | |
| >>cell parameters id | MP | | Cell parameters id 10.3.6.9 | Identifies reference cell for SFN | |
| >UTRAN GANSS reference time | | | | | REL-7 |
| >>UE GANSS timing of cell frames | MP | | Integer(0 . . . 86399999999750 by step of 250) | GANSS Time of Day in ns | REL-7 |
| >>GANSS Time ID | OP | | Integer(0 . . . 7) | Absence of this field means Galileo. For coding description see NOTE 2 in 10.3.7.93a. | REL-7 |
| >>GANSS TOD Uncertainty | OP | | Integer(0 . . . 127) | Coding as in 10.3.7.96a | REL-7 |
| >>CHOICE mode | MP | | | | REL-7 |
| >>>FDD | | | | | REL-7 |
| >>>>Primary CPICH Info | MP | | Primary CPICH Info 10.3.6.60 | Identifies the reference cell for the GANSS TOD-SFN relationship | REL-7 |
| >>>TDD | | | | | REL-7 |
| >>>>cell parameters id | MP | | Cell parameters id 10.3.6.9 | Identifies the reference cell for the GANSS TOD-SFN relationship. | REL-7 |
| >>Reference SFN | MP | | Integer(0 . . . 4095) | The SFN for which the location is valid. This IE indicates the SFN at which the UE timing of cell frame is captured. | REL-7 |
| >GANSS reference time only | | | | | REL-7 |
| >>GANSS TOD msec | MP | | Integer(0 . . .3599999) | GANSS Time of Day in milliseconds (rounded down to the nearest millisecond unit). | REL-7 |
| >>GANSS Time ID | OP | | Integer(0 . . . 7) | Absence of this field means Galileo. For coding description see NOTE 2 in 10.3.7.93a. | REL-7 |
| CHOICE Position estimate | MP | | | The position estimate is provided in WGS-84 reference system. | |
| >Ellipsoid Point | | | Ellipsoid Point; 10.3.8.4a | | |
| >Ellipsoid point with | | | Ellipsoid point with | | |

| Information Element/ Group name | Need | Multi | Type and Reference | Semantics description | Version |
|---|---|---|---|---|---|
| uncertainty circle | | | uncertainty circle 10.3.8.4d | | |
| >Ellipsoid point with uncertainty ellipse | | | Ellipsoid point with uncertainty ellipse 10.3.8.4e | | |
| >Ellipsoid point with altitude | | | Ellipsoid point with altitude 10.3.8.4b | | |
| >Ellipsoid point with altitude and uncertainty ellipsoid | | | Ellipsoid point with altitude and uncertainty ellipsoid 10.3.8.4c | | |
| Position Data | MP | | Bit string(16) | For each bit, if set to '1', indicates that respective GNSS or position system was used for position calculation. Bit 0: OTDOA bit 1: GPS bit 2: Galileo bit 3-15: reserved | REL-7 |
| | | | | bit 3: SBAS bit 4: Modernized GPS bit 5: QZSS bit 6: GLONASS bit 7-15: reserved | REL-8 |
| | | | | bit 7: BDS bit 8-15: reserved | REL-12 |
| | | | | bit 8: WLAN/BT bit 9: Barometric Sensors bit 10-15: reserved | REL-13 |
| CHOICE Velocity estimate | OP | | | | REL-7 |
| >Horizontal Velocity | | | Horizontal Velocity 10.3.8.4h | | REL-7 |
| >Horizontal with Vertical Velocity | | | Horizontal with Vertical Velocity 10.3.8.4i | | REL-7 |
| >Horizontal Velocity with Uncertainty | | | Horizontal Velocity with Uncertainty 10.3.8.4j | | REL-7 |
| >Horizontal with Vertical Velocity and Uncertainty | | | Horizontal with Vertical Velocity and Uncertainty 10.3.8.4k | | REL-7 |
| UE Positioning GPS Referenced me Uncertainty | CV-Tutran-gps | | UE positioning GPS reference time uncertainty 10.3.7.96a | | REL-7 |

| Condition | Explanation |
|---|---|
| Tutran-gps | This IE is optionally present if "UTRAN GPS reference time" is included and not needed otherwise. |

3GPP TS 25.331 Section 10.3.7.111 entitled "UE positioning reporting quantity" can be modified as listed in the following table. This Information Element (IE) of this table expresses allowed/required location method(s) and provides information regarding desired Quality of Service (QoS).

| Information Element/ Group name | Need | Multi | Type and Reference | Semantics description | Version |
|---|---|---|---|---|---|
| Method Type | MP | | Enumerated(UE assisted, UE based, UE based is preferred but UE assisted is allowed, UE assisted is preferred but UE based is allowed) | | |
| Positioning Methods | MP | | Enumerated(OTDOA, GPS, OTDOA or GPS, Cell ID) | | |
| Response Time | MP | | Integer(1, 2, 4, 8, 16, 32, 64, 128) | This IE shall be ignored. | |
| Horizontal Accuracy | CV-MethodType | | Bit string(7) | The uncertainty is derived from the "uncertainty code" k by $r = 10*(1.1^k - 1)$ in meters. | |

| Information Element/ Group name | Need | Multi | Type and Reference | Semantics description | Version |
|---|---|---|---|---|---|
| Vertical Accuracy | CV-MethodType | | Bit string(7) | The uncertainty is derived from the "uncertainty code" k by $r = 45*(1.025^k - 1)$ in meters. | |
| GPS timing of Cell wanted | MP | | Boolean | If TRUE the SRNC wants the UE to report the SFN-GPS timing of the reference cell. This is however optional in the UE. | |
| Multiple Sets | MP | | Boolean | This IE shall be ignored. | |
| Additional Assistance Data Request | MP | | Boolean | TRUE indicates that the UE is requested to send the IE "GPS Additional Assistance Data Request" and/or the "IE "GANSS Additional Assistance Data Request" (if the IE "GANSS Positioning Methods" is included) when the IE "UE positioning Error" is present in the UE positioning measured results. FALSE indicates that the UE shall use the assistance data available. | |
| Environment Characterisation | OP | | Enumerated(possibly heavy multipath and NLOS conditions, no or light multipath and usually LOS conditions, not defined or mixed environment) | One spare value is needed. | |
| Velocity Requested | OP | | Enumerated (TRUE) | If this element is present the UE is requested to send a velocity estimate | REL-7 |
| GANSS Positioning Methods | OP | | Bit string(16) | For each bit, if set to '1', indicates that respective GNSS is allowed, bit 0: GPS bit 1: Galileo bit 2-15: reserved for future GNSSes Note 1 | REL-7 |
| | | | | bit 2: SBAS (WAAS, EGNOS, MSAS, GAGAN) bit 3: Modernized GPS (L1C, L2C, L5) bit 4: QZSS bit 5: GLONASS bit 6-15: reserved for future GNSSes Note 1 | REL-8 |
| | | | | bit 6: BDS bit 7-15: reserved for future GNSSes Note 1 | REL-12 |
| GANSS timing of Cell wanted | OP | | Bit string(8) | Each bit refers to a GANSS. Bit 0 is for Galileo. Other bits are reserved. If one bit is set to one the SRNC wants the UE to report the SFN-GANSS timing of the reference cell. This is however optional in the UE. | REL-7 |
| | | | | Bit 1 is for Modernized GPS; Bit 2 is for QZSS; Bit 3 is for GLONASS; Other bits are reserved. If one bit is set to one the SRNC wants the UE to report the SFN-GANSS timing of the reference | Rel-8 |

| Information Element/ Group name | Need | Multi | Type and Reference | Semantics description | Version |
|---|---|---|---|---|---|
| | | | | cell. This is however optional in the UE. If more than one bit is set to one, the UE will select the GANSS among the allowed GANSS for the SFN-GANSS timing of the reference cell in the measurement report. Bit 4 is for BDS; Other bits are reserved. If one bit is set to one the SRNC wants the UE to report the SFN-GANSS timing of the reference cell. This is however optional in the UE. If more than one bit is set to one, the UE will select the GANSS among the allowed GANSS for the SFN-GANSS timing of the reference cell in the measurement report. | REL-12 |
| GANSS Carrier-Phase Measurement Requested | OP | | Bit string(8) | Each bit refers to a GANSS. Bit 0 is for Galileo. Other bits are reserved. This is however optional in the UE. | REL-7 |
| | | | | Bit 1 is for SBAS; Bit 2 is for Modernized GPS; Bit 3 is for QZSS; Bit 4 is for GLONASS; Other bits are reserved. This is however optional in the UE. | Rel-8 |
| | | | | Bit 5 is for BDS; Other bits are reserved. This is however optional in the UE. | REL-12 |
| GANSS Multi-frequency Measurement Requested | OP | | Bit String(8) | Each bit refers to a GANSS. Bit 0 is for Galileo; Bit 1 is for SBAS; Bit 2 is for Modernized GPS; Bit 3 is for QZSS; Bit 4 is for GLONASS; Other bits are reserved. This is however optional in the UE. | REL-8 |
| | | | | Bit 5 is for BDS; Other bits are reserved. This is however optional in the UE. | REL-12 |
| indoor method type | MP | | Enumerated( UE assisted, standalone, UE assisted is preferred but standalone is allowed, standalone is preferred but UE assisted is allowed) | | REL-13 |
| Indoor Positioning Methods | MP | | Enumerated(WLAN/BT, Barometric Sensors) | | REL-13 |
| WLAN/BT Measurements Requested | OP | | Bit String(8) | Bit 0 is for RSSI Bit 1 is for RTT Other bits are reserved. | REL-13 |

| Condition | Explanation |
|---|---|
| Method Type | The IE is optional if the IE "Method Type" is "UE assisted"; otherwise it is mandatory present. |

3GPP TS 25.331 Section 10.3.7.141 entitled "UE positioning WLAN/BT measured results" can include information elements/groups as listed in the following table.

| Information Element/ Group name | Need | Multi | Type and reference | Semantics description | Version |
|---|---|---|---|---|---|
| WLAN Measured result | MP | 1 to <maxWlan> | | | REL-13 |
| >WLAN AP Bssid | MP | | Octet string (6) | Basic Service Set Identifier defined in IEEE 802.11-2012 [Reference 87]. | REL-13 |
| >WLAN AP Ssid | OP | | Octet string (1 . . . 32) | Service Set Identifier defined in IEEE 802.11-2012 [Reference 87]. | REL-13 |
| >WLAN RSSI | OP | | INTEGER(-127 . . . 128) | | REL-13 |
| >WLAN RTT value | OP | | INTEGER(-0 . . . 16777215) | | REL-13 |
| >WLAN RTT units | OP | | ENUMERATED {microseconds, hundredsofnanoseconds, tensofnanoseconds, nanoseconds, tenthsofnanosecond) | | REL-13 |
| >WLAN RTT accuracy | OP | | INTEGER(0 . . . 255) | | REL-13 |
| BT Measured result | MP | 1 to <maxBt> | | | REL-13 |
| >BT mac address | MP | | Octet string (6) | | REL-13 |
| >BT RSSI | OP | | INTEGER(-127 . . . 128) | | REL-13 |
| >BT RTT value | OP | | INTEGER(-0 . . . 16777215) | | REL-13 |
| >BT RTT units | OP | | ENUMERATED {microseconds, hundredsofnanoseconds, tensofnanoseconds, nanoseconds, tenthsofnanosecond) | | REL-13 |
| >BT RTT accuracy | OP | | INTEGER(0 . . . 255) | | REL-13 |

3GPP TS 25.331 Section 10.3.7.142 entitled "UE positioning Sensors measured results" can include information elements/groups as listed in the following table.

| Information Element/ Group name | Need | Multi | Type and reference | Semantics description | Version |
|---|---|---|---|---|---|
| Uncompensated Barometric Pressure | MP | | INTEGER (30000 . . . 115000) | This field specifies the measured atmospheric pressure in units of Pa (corresponding to a numerical altitude resolution of about 0.1 m at sea level). This field SHALL be obtained from the measured atmospheric pressure output of one or more sensors on the target prior to any adjustment made externally to the sensor(s). | REL-13 |

What is claimed is:

1. A method for estimating an indoor location of a wireless communication device, the method comprising:
by the wireless communication device:
providing capability information of the wireless communication device to a Universal Mobile Telecommunications System (UMTS) terrestrial radio access network (UTRAN) network element of a wireless access network, the capability information indicating capabilities of the wireless communication device to determine an indoor location estimate of the wireless communication device based at least in part on barometric pressure sensor measurements and on one or more of: wireless local area network (WLAN) access point (AP) measurements or wireless personal area network (WPAN) measurements;

receiving from the UTRAN network element an indication of an indoor location determination method preference including a standalone device-based indoor location determination method;

determining the indoor location estimate of the wireless communication device based at least in part on the barometric pressure sensor measurements and one or more of: the WLAN AP measurements or the WPAN measurements; and providing the indoor location estimate of the wireless communication device to the UTRAN network element of the wireless access network, wherein the capability information provided to the UTRAN network element indicates the wireless communication device supports the standalone device-based indoor location determination method.

2. The method of claim 1, wherein the wireless communication device provides the indoor location estimate to the UTRAN network element of the wireless access network in a radio resource control (RRC) measurements report message.

3. The method of claim 1, wherein the indoor location estimate comprises estimates of a horizontal, planar location position and a vertical location position of the wireless communication device.

4. The method of claim 3, wherein the horizontal, planar location position estimate comprises a longitude estimate and a latitude estimate, and the vertical location position estimate comprises an altitude estimate of the wireless communication device.

5. The method of claim 1, wherein the wireless communication device provides the indoor location estimate to the UTRAN network element of the wireless access network as part of an emergency services connection.

6. The method of claim 5, wherein the emergency services connection comprises an enhanced 911 (E911) connection.

7. The method of claim 1, further comprising:
by the wireless communication device:
receiving, from the UTRAN network element of the wireless access network, barometric pressure sensor reference data and one or more of: WLAN AP information or WPAN information,
wherein the determining the indoor location estimate of the wireless communication device is further based at least in part on the barometric pressure sensor reference data and one or more of: the WLAN AP information or the WPAN information.

8. The method of claim 7, wherein the wireless communication device receives the WLAN AP information, the WPAN information, and/or the barometric pressure sensor reference data from the UTRAN network element of the wireless access network in one or more of: a radio resource control (RRC) measurements control message, an RRC assistance data message, or an RRC system information block (SIB) message.

9. The method of claim 7, wherein the WLAN AP information or the WPAN information received from the UTRAN network element of the wireless access network by the wireless communication device comprises identifiers for one or more WLAN APs and/or WPANs.

10. The method of claim 7, wherein the WLAN AP information or the WPAN information received from the UTRAN network element of the wireless access network by the wireless communication device comprises one or more of: a service set identifier (SSID), a frequency band, a frequency channel, a transmit power level, or an antenna gain.

11. The method of claim 7, wherein the barometric pressure sensor reference data received from the UTRAN network element of the wireless access network by the wireless communication device comprises one or more mean sea level pressure values.

12. The method of claim 1, wherein the determining the indoor location estimate of the wireless communication device is further based at least in part on one or more of: global positioning system (GPS) signals or global navigation satellite system (GNSS) signals received by the wireless communication device.

13. The method of claim 1, further comprising:
by the wireless communication device:
receiving a capabilities inquiry message from the UTRAN network element of the wireless access network,
wherein the wireless communication device provides the capability information to the UTRAN network element of the wireless access network in response to receipt of the capabilities inquiry message from the UTRAN network element of the wireless access network.

14. A wireless communication device comprising:
wireless circuitry comprising at least one transceiver and at least one antenna; and
processing circuitry comprising one or more processors communicatively coupled to a memory storing instructions that when executed by the one or more processors cause the wireless communication device to:
provide capability information of the wireless communication device to a Universal Mobile Telecommunications System (UMTS) terrestrial radio access network (UTRAN) network element of a wireless access network, the capability information indicating capabilities of the wireless communication device to determine an indoor location estimate of the wireless communication device based at least in part on barometric pressure sensor measurements and on one or more of: wireless local area network (WLAN) access point (AP) measurements or wireless personal area network (WPAN) measurements;
receive from the UTRAN network element an indication of an indoor location determination method preference including a standalone device-based indoor location determination method;
determine the indoor location estimate of the wireless communication device based at least in part on the barometric pressure sensor measurements and one or more of: the WLAN AP measurements or the WPAN measurements; and
provide the indoor location estimate of the wireless communication device in a radio resource control (RRC) signaling message to the UTRAN network element of the wireless access network,
wherein the capability information provided to the UTRAN network element indicates the wireless communication device supports the standalone device-based indoor location determination method.

15. The wireless communication device of claim 14, wherein the indoor location estimate comprises estimates of a horizontal, planar location position and a vertical location position of the wireless communication device.

16. The wireless communication device of claim 15, wherein the horizontal, planar location position estimate comprises a longitude estimate and a latitude estimate, and the vertical location position estimate comprises an altitude estimate of the wireless communication device.

17. The wireless communication device of claim 14, wherein execution of the instructions further causes the wireless communication device to:
receive, from the UTRAN network element of the wireless access network, barometric pressure sensor reference data and one or more of: WLAN AP information or WPAN information,
wherein the wireless communication device determines the indoor location estimate of the wireless communication device further based at least in part on the barometric pressure sensor reference data and one or more of: the WLAN AP information or the WPAN information.

18. The wireless communication device of claim 14, wherein execution of the instructions further causes the wireless communication device to:
receive a capabilities inquiry message from the UTRAN network element of the wireless access network,
wherein the wireless communication device provides the capability information to the UTRAN network element of the wireless access network in response to receipt of the capabilities inquiry message from the UTRAN network element of the wireless access network.

19. The wireless communication device of claim 14, wherein the capability information provided to the UTRAN network element includes an indication of whether the wireless communication device supports device-based location estimation, device-assisted location estimation, or both.

20. The wireless communication device of claim 14, wherein execution of the instructions further causes the wireless communication device to:
receive from the UTRAN network element an indication of whether the wireless communication device is to indicate to the UTRAN network element when entering and/or exiting an indoor location.

21. An apparatus configurable for operation in a wireless communication device, the apparatus comprising:
processing circuitry comprising one or more processors communicatively coupled to a memory storing instructions that when executed by the one or more processors cause the wireless communication device to:
provide capability information of the wireless communication device to a Universal Mobile Telecommunications System (UMTS) terrestrial radio access network (UTRAN) network element of a wireless access network, the capability information indicating capabilities of the wireless communication device to determine an indoor location estimate of the wireless communication device based at least in part on barometric pressure sensor measurements and on one or more of: wireless local area network (WLAN) access point (AP) measurements or wireless personal area network (WPAN) measurements;
receive from the UTRAN network element an indication of an indoor location determination method preference including a standalone device-based indoor location determination method;
determine the indoor location estimate of the wireless communication device based at least in part on the barometric pressure sensor measurements and one or more of: the WLAN AP measurements or the WPAN measurements; and
provide the indoor location estimate of the wireless communication device in a radio resource control (RRC) signaling message to the UTRAN network element of the wireless access network,
wherein the capability information provided to the UTRAN network element indicates the wireless communication device supports the standalone device-based indoor location determination method.

22. The apparatus of claim 21,
wherein the indoor location estimate comprises estimates of a horizontal, planar location position and a vertical location position of the wireless communication device.

23. The apparatus of claim 22,
wherein the horizontal, planar location position estimate comprises a longitude estimate and a latitude estimate, and the vertical location position estimate comprises an altitude estimate of the wireless communication device.

24. The apparatus of claim 21, wherein execution of the instructions further causes the wireless communication device to:
receive, from the UTRAN network element of the wireless access network, barometric pressure sensor reference data and one or more of: WLAN AP information or WPAN information,
wherein the wireless communication device determines the indoor location estimate of the wireless communication device further based at least in part on the barometric pressure sensor reference data and one or more of: the WLAN AP information or the WPAN information.

25. The apparatus of claim 21, wherein execution of the instructions further causes the wireless communication device to:
receive a capabilities inquiry message from the UTRAN network element of the wireless access network,
wherein the wireless communication device provides the capability information to the UTRAN network element of the wireless access network in response to receipt of the capabilities inquiry message from the UTRAN network element of the wireless access network.

26. The apparatus of claim 21, wherein the capability information provided to the UTRAN network element includes an indication of whether the wireless communication device supports device-based location estimation, device-assisted location estimation, or both.

27. The apparatus of claim 21, wherein execution of the instructions further causes the wireless communication device to:
receive from the UTRAN network element an indication of whether the wireless communication device is to indicate to the UTRAN network element when entering and/or exiting an indoor location.

\* \* \* \* \*